United States Patent [19]

Maher, Jr.

[11] Patent Number: 6,018,150

[45] Date of Patent: Jan. 25, 2000

[54] METHOD OF HEATING A MEDIUM TO A DESIRED TEMPERATURE

[75] Inventor: Charles A. Maher, Jr., Mustang, Okla.

[73] Assignee: Tridelta Industries, Inc., Mentor, Ohio

[21] Appl. No.: 08/777,756

[22] Filed: Dec. 30, 1996

Related U.S. Application Data

[63] Continuation-in-part of application No. 08/409,166, Mar. 23, 1995, Pat. No. 5,596,514.

[51] Int. Cl.$^7$ ........................................ H05B 1/02
[52] U.S. Cl. .......................... 219/497; 219/441; 219/505; 219/508; 99/329 R; 99/330
[58] Field of Search ................... 219/494, 497, 219/501, 505, 508, 441, 442; 99/325–334; 395/90

[56] References Cited

U.S. PATENT DOCUMENTS

| | | | |
|---|---|---|---|
| Re. 29,609 | 4/1978 | Wadia et al. | 219/494 |
| 3,094,875 | 6/1963 | Fluegel | 73/359 |
| 3,217,633 | 11/1965 | Anetsberger | 99/327 |
| 3,326,692 | 6/1967 | Martino et al. | 99/111 |
| 3,525,299 | 8/1970 | Gouwens | 99/336 |
| 3,665,159 | 5/1972 | Becker et al. | 219/497 |
| 3,694,669 | 9/1972 | Witt et al. | 307/252 F |
| 3,732,468 | 5/1973 | Witt et al. | 307/149 |
| 3,800,779 | 4/1974 | Moore et al. | 126/374 |
| 3,863,049 | 1/1975 | Hinman | 219/389 |
| 3,866,472 | 2/1975 | Witt | 73/362 AR |
| 3,870,859 | 3/1975 | Price | 219/437 |
| 3,904,852 | 9/1975 | Rivelli et al. | 219/442 |
| 3,911,250 | 10/1975 | Price | 219/442 |
| 3,924,101 | 12/1975 | Beard | 219/490 |
| 3,938,498 | 2/1976 | Price | 126/374 |
| 3,950,632 | 4/1976 | Rivelli | 219/523 |
| 3,955,067 | 5/1976 | Eldridge | 219/497 |
| 3,979,056 | 9/1976 | Barnes | 235/92 MT |
| 3,998,146 | 12/1976 | Price | 99/403 |
| 4,032,749 | 6/1977 | Price | 219/442 |
| 4,036,995 | 7/1977 | Koether et al. | 426/233 |
| 4,058,703 | 11/1977 | Price | 219/492 |
| 4,077,690 | 3/1978 | Koether | 339/89 R |
| 4,097,707 | 6/1978 | Kobayashi et al. | 219/10.55 B |
| 4,195,667 | 4/1980 | Moore et al. | 137/637.1 |
| 4,197,581 | 4/1980 | Watrous et al. | 364/400 |
| 4,206,872 | 6/1980 | Levine | 236/46 R |
| 4,210,123 | 7/1980 | Moore et al. | 126/374 |
| 4,210,177 | 7/1980 | Moore et al. | 137/613 |
| 4,259,567 | 3/1981 | Moore et al. | 219/327 |
| 4,278,872 | 7/1981 | Koether et al. | 219/497 |
| 4,282,423 | 8/1981 | Volz | 219/490 |
| 4,296,632 | 10/1981 | Bloomer et al. | 73/362 AR |
| 4,301,509 | 11/1981 | Haase et al. | 364/557 |
| 4,304,177 | 12/1981 | Loeffler et al. | 99/333 |
| 4,320,285 | 3/1982 | Koether | 219/497 |
| 4,324,173 | 4/1982 | Moore et al. | 99/330 |

(List continued on next page.)

FOREIGN PATENT DOCUMENTS 2 011 677  7/1979  United Kingdom.

OTHER PUBLICATIONS

OMEGA Catalog, 1989, pp. P–5 –P–8, P–10, P–11.
Ziemacki, Mike, "Fuzzy Logic Microcontroller," ECN.

*Primary Examiner*—Mark H. Paschall
*Attorney, Agent, or Firm*—Mark Kusner

[57] ABSTRACT

A method for heating a medium in a heating apparatus comprising establishing a setpoint temperature for the medium, determining thermal characteristics of the heating apparatus and the medium during a first mode of operation, the thermal characteristics establishing an idle-on pulse duration for raising the temperature of the medium a first amount, generating at a move-to-idle temperature a move-to-idle pulse of heat having a move-to-idle pulse duration, the move-to-idle pulse duration being sufficient to raise the temperature of the medium to a temperature above the setpoint temperature, wherein the move-to-idle pulse duration is derived from the idle-on pulse duration and the deviation between the setpoint temperature and the move-to-idle temperature.

17 Claims, 11 Drawing Sheets

U.S. PATENT DOCUMENTS

| | | | |
|---|---|---|---|
| 4,362,094 | 12/1982 | Polster | 99/342 |
| 4,377,733 | 3/1983 | Yamaguchi et al. | 219/10.55 B |
| 4,379,964 | 4/1983 | Kanazawa et al. | 219/492 |
| 4,401,884 | 8/1983 | Kusunoki et al. | 219/492 |
| 4,420,006 | 12/1983 | Moore et al. | 134/167 R |
| 4,437,159 | 3/1984 | Waugh | 364/400 |
| 4,455,480 | 6/1984 | Matsumoto et al. | 219/497 |
| 4,465,228 | 8/1984 | Mori et al. | 236/20 A |
| 4,503,320 | 3/1985 | Polster | 219/441 |
| 4,549,527 | 10/1985 | Davis | 126/374 |
| 4,551,618 | 11/1985 | Payne | 219/510 |
| 4,585,925 | 4/1986 | Andre | 219/497 |
| 4,601,004 | 7/1986 | Holt et al. | 364/557 |
| 4,636,949 | 1/1987 | Longabaugh | 364/400 |
| 4,663,710 | 5/1987 | Waugh et al. | 364/400 |
| 4,672,540 | 6/1987 | Waugh et al. | 364/400 |
| 4,688,475 | 8/1987 | Witt et al. | 99/325 |
| 4,740,888 | 4/1988 | Ceste, Sr. et al. | 364/187 |
| 4,742,455 | 5/1988 | Schreyer | 364/400 |
| 4,782,445 | 11/1988 | Pasquini | 364/400 |
| 4,812,625 | 3/1989 | Ceste, Sr. | 219/497 |
| 4,812,963 | 3/1989 | Albrecht et al. | 364/131 |
| 4,858,119 | 8/1989 | Waugh et al. | 364/400 |
| 4,864,498 | 9/1989 | Pasquini et al. | 364/400 |
| 4,901,917 | 2/1990 | Littell, III | 236/46 R |
| 4,911,068 | 3/1990 | Koether et al. | 99/325 |
| 4,913,038 | 4/1990 | Burkett et al. | 99/331 |
| 4,968,515 | 11/1990 | Burkett et al. | 426/233 |
| 5,043,860 | 8/1991 | Koether et al. | 364/138 |
| 5,044,262 | 9/1991 | Burkett et al. | 99/327 |
| 5,060,559 | 10/1991 | Winter | 99/325 |
| 5,220,864 | 6/1993 | Ejiri et al. | 99/330 |
| 5,235,148 | 8/1993 | Yamaguchi et al. | 219/10.55 B |
| 5,240,725 | 8/1993 | Akamatsu et al. | 426/233 |
| 5,352,866 | 10/1994 | Cartwright et al. | 219/497 |
| 5,454,511 | 10/1995 | Van Ostrand et al. | 236/46 R |
| 5,575,194 | 11/1996 | Maher, Jr. et al. | 99/330 |
| 5,582,755 | 12/1996 | Maher, Jr. et al. | 219/492 |

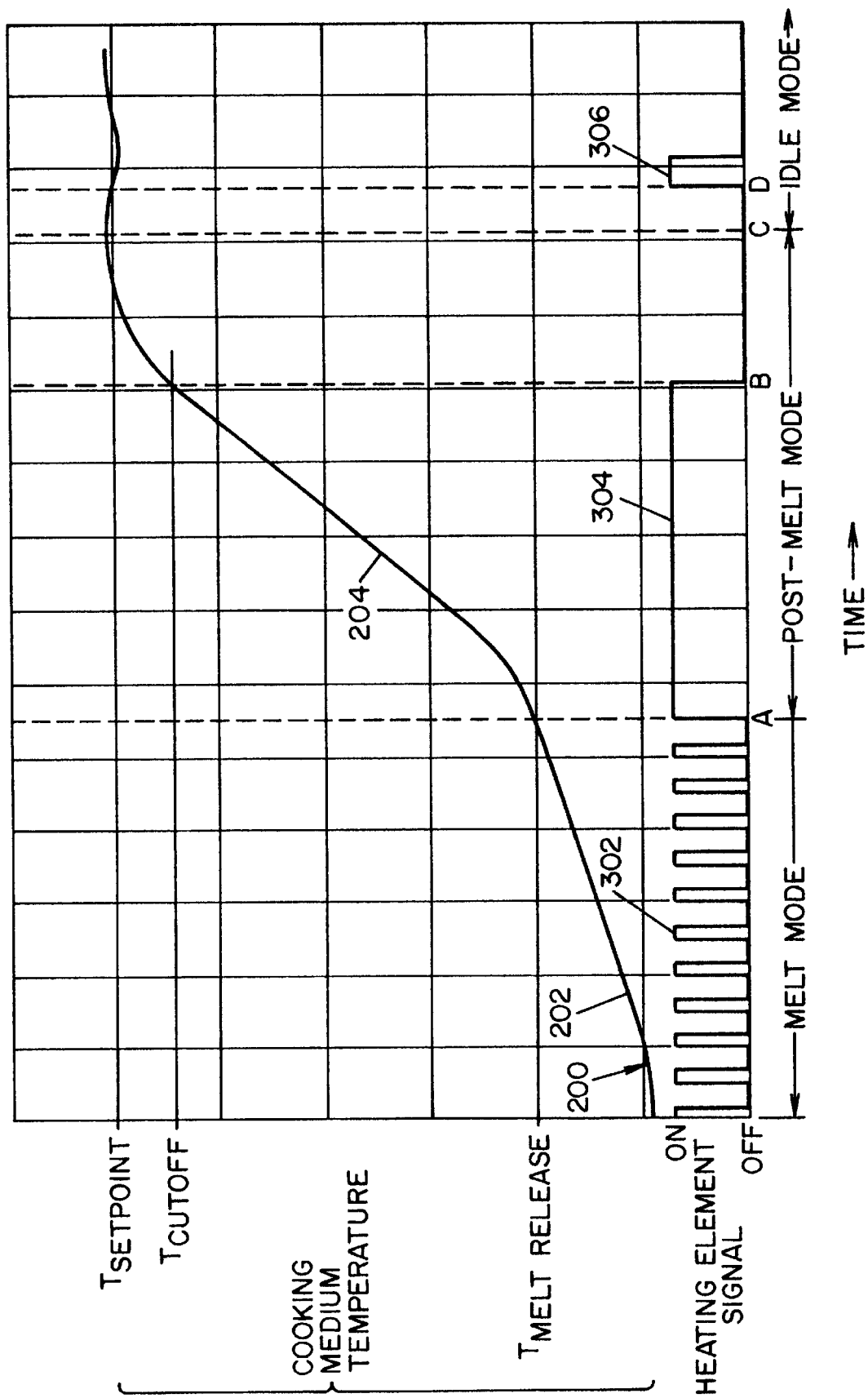

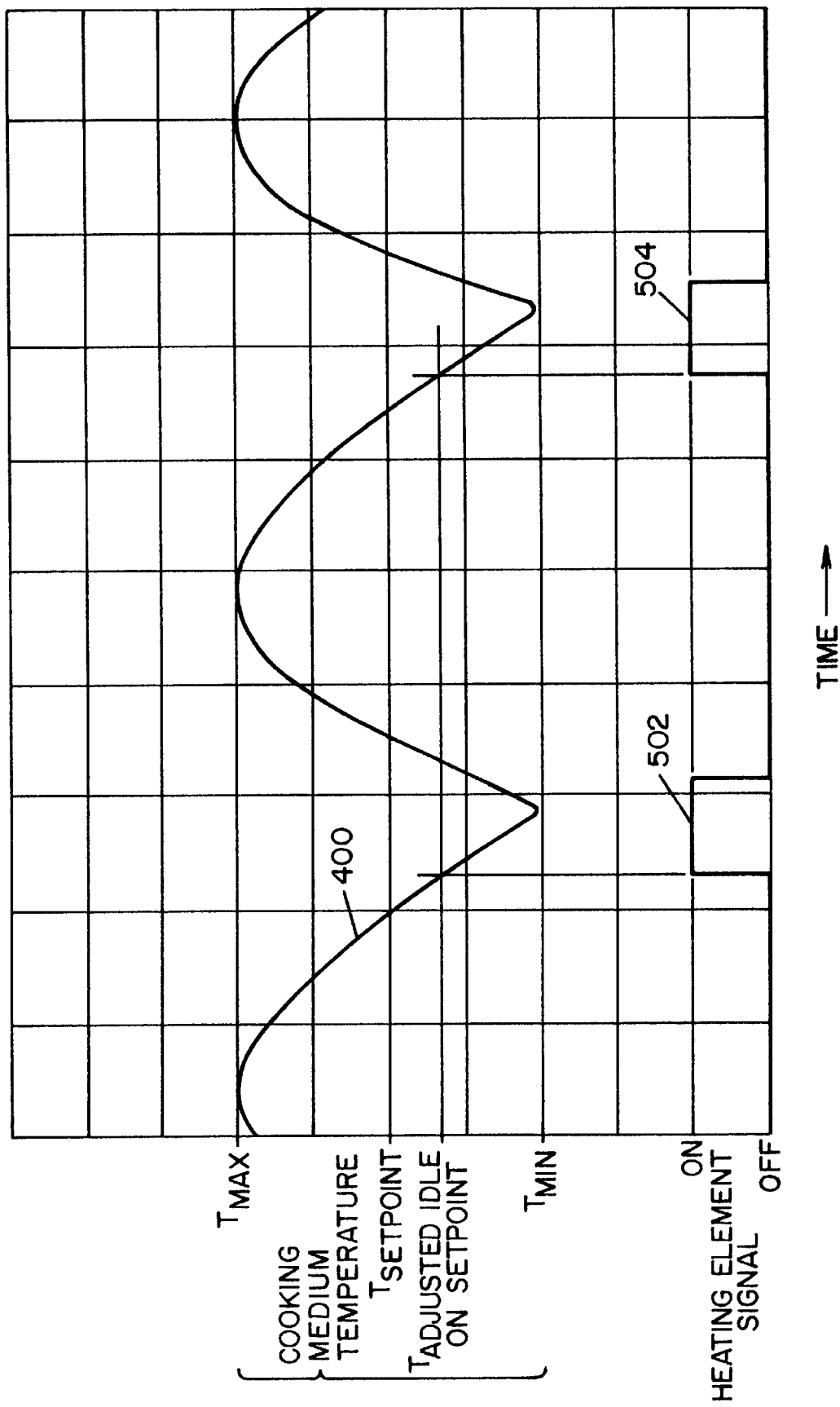

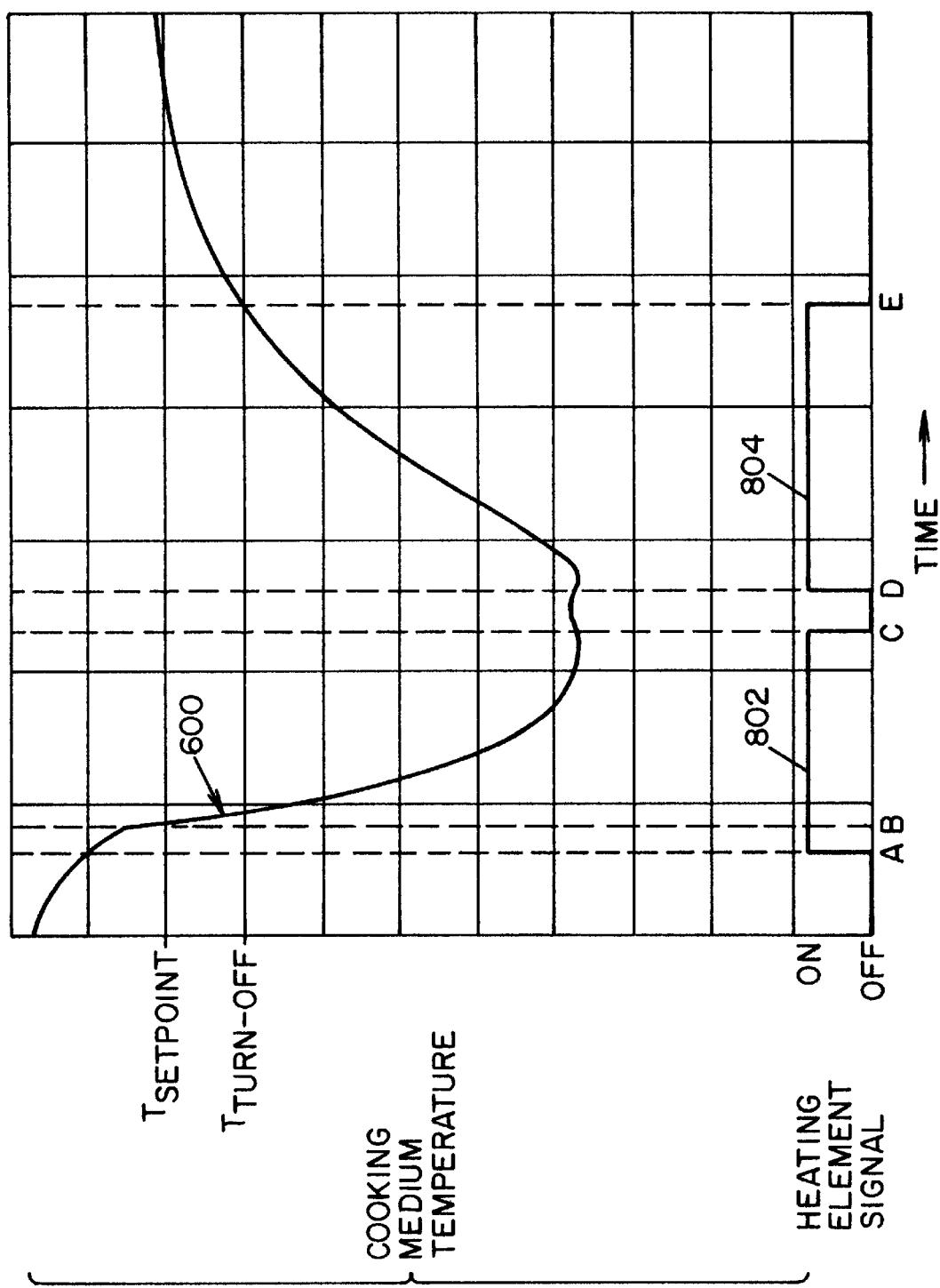

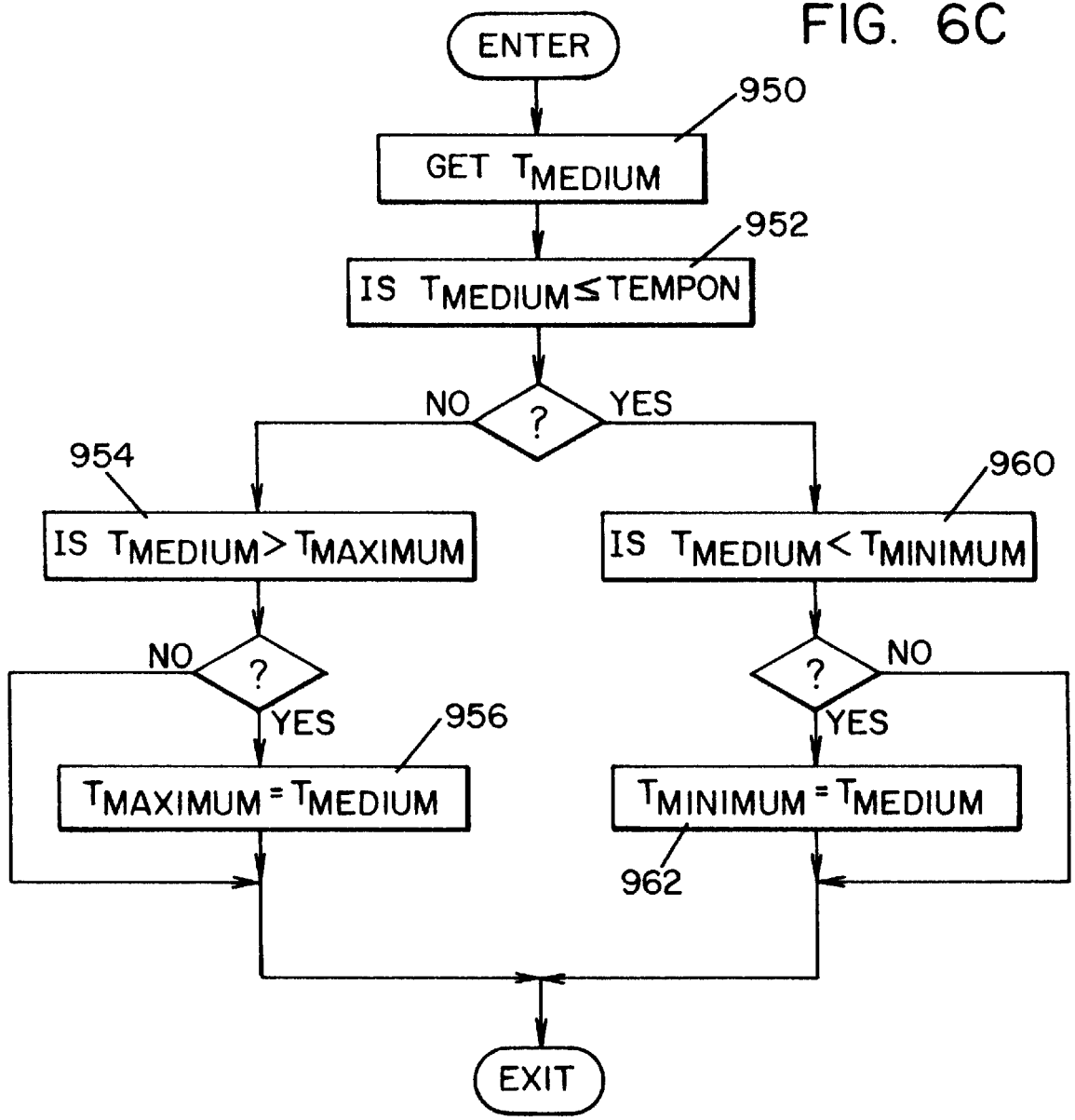

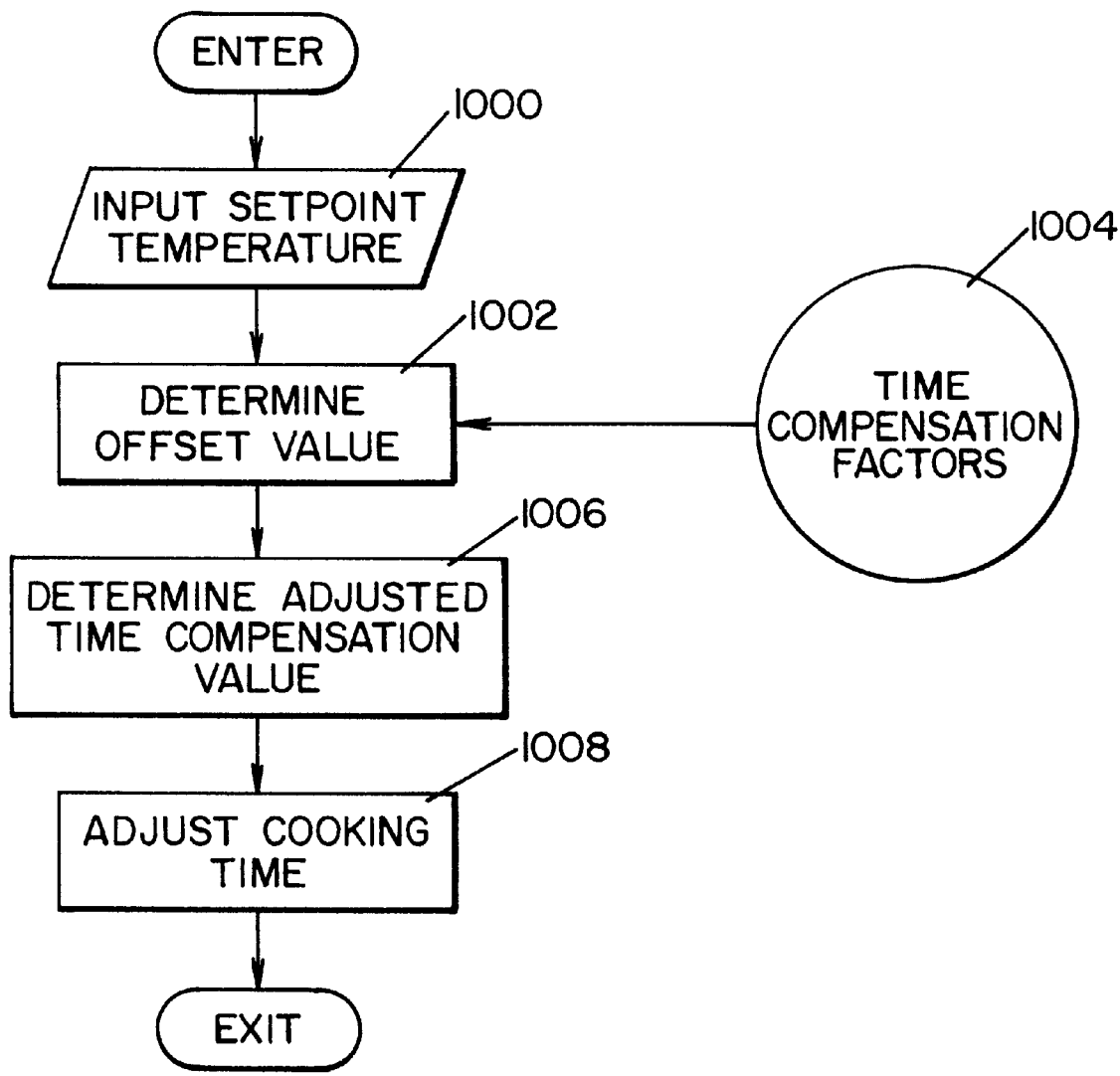

METHOD OF HEATING A MEDIUM TO A DESIRED TEMPERATURE

This application is a continuation-in-part of application Ser. No. 08/409,166 filed on Mar. 23, 1995 now U.S. Pat. No. 5,596,514.

FIELD OF THE INVENTION

The present invention relates generally to an electronic control system, and more particularly to a control system for use with a heating apparatus.

The present invention finds advantageous application to a deep fat fryer cooking system and will be described with particular reference thereto, it being appreciated that the present invention has broader applications and may be used with other heating apparatus such as ovens, pressure cookers, pasta cookers, holding cabinets, furnaces, and water heaters.

BACKGROUND OF THE INVENTION

It has been found that certain food products cook and taste best when heated at a specific temperature for a set period of time. As a result, restaurants and food service establishments, especially franchise food chains, have instituted strict criteria for preparation of fried food products. Consequently, restaurants and food service establishments will often require a deep fat fryer which can operate and maintain specific heating parameters.

Deep fat fryers are widely used in commercial food vending establishments, such as fast food restaurants, to heat food products, such as potatoes, fish, chicken, or the like. Accordingly, desirable characteristics in a deep fat fryer include rapid heating, without significant overshoot, to an operator selected cooking temperature, accurate maintenance of the cooking medium temperature to a temperature within a narrow range around the operator selected cooking temperature, minimal wearing of heating element components, and safety features which prevent injury to the operator or damage to the fryer.

Prior art fryers known heretofore typically include a vat for holding a cooking medium, temperature selection means for inputting a desired cooking temperature for a food product, a heating element (e.g., a gas burner or electric element) for heating the cooking medium, temperature sensing means for sensing the temperature of the cooking medium, and a fryer controller for providing overall control of fryer operations. One significant function performed by the fryer controller is control of the heating element.

The heating element is operated in a melt mode, a post-melt mode, an idle mode, a cook mode, and a boil mode. In the melt mode, a "cold" cooking medium is heated at a slow rate to gradually introduce heat to the cooking medium. The post-melt mode quickly heats the cooking medium to reach an operator selected setpoint temperature (i.e., cooking temperature) which is optimum for cooking the food product. The cooking medium is maintained at a temperature around the operator selected setpoint temperature in the idle mode. In this mode, the fryer operates in a steady state before, during or after a cooking operation. In the cook mode, food product is introduced into the cooking medium, and depending on the load size, may cause a drastic drop in the temperature of the cooking medium. It is during this mode that the food product is cooked. In a boil mode, the cooking medium is removed from the vat so that a cleaning operation can take place. In this respect, water and detergent are introduced into the vat and heated to a predetermined temperature (e.g., approximately 195° F.).

With regard to the idle mode, prior art systems employ several different approaches. A first approach is known as ON/OFF control. The heating element is either on or off, with no middle state. The heating element is ON when the temperature of the cooking medium is below the operator selected setpoint temperature, and OFF when the cooking medium temperature is above the setpoint temperature. A second approach is known as proportional control. The proportioning action occurs within a "proportional band" around the setpoint temperature. Outside this band, the controller functions as an ON/OFF unit, with the heating element either fully ON (below the band) or fully OFF (above the band). However, within the band, the heating element is turned on and off for short intervals, wherein the ratio of ON time to OFF time is varied based upon the difference between the cooking medium temperature and the setpoint temperature. A third approach is known as PID (proportional, plus integral plus derivative control). PID combines proportional control with two additional adjustments, which help compensate to changes in the system. Integral action produces an output that forces the temperature back to the setpoint thus eliminating the "droop" associated with "Proportional Only" control, and derivative determines how fast (i.e., the rate) the cooking medium temperature is changing.

One feature common to many prior art idle mode control strategies is that they attempt to minimize the peak-to-valley excursions of the cooking medium temperature. The peak-to-valley excursion is the range of cooking medium temperatures obtained around the setpoint temperature. The maximum temperature establishes the "peak," while the minimum temperature establishes the "valley." The peak-to-valley excursion of the cooking medium temperature is usually minimized by periodically pulsing the heating element, wherein the pulses have a fixed duty cycle. In this respect, the pulses of heat are intended to add the heat necessary to balance the heat lost to the surrounding environment.

There is often a need to quickly and accurately enter an idle mode, wherein a steady state operation is established. In this regard, there are many situations where it may be necessary or desirable to quickly increase the temperature of the cooking medium to a temperature at or above the setpoint temperature, and thereafter to maintain the cooking medium at a temperature around the setpoint temperature. For instance, this situation may arise when the cooking medium has failed to reach a temperature near the setpoint temperature and it is desired to begin a cooking operation. This situation may also arise when a first cooking operation has been completed, the cooking medium is at a temperature below the setpoint temperature, and it is desired to begin a second cooking operation. Moreover, this situation may arise during a cooking operation where, due to stirring of the cooking medium, the cooking medium temperature has dropped below the setpoint temperature. Therefore, the cooking medium may be at various temperatures below the setpoint temperature at the time in which it is desired to move to the setpoint temperature.

In view of the foregoing, there is a need for a fryer controller that can quickly and accurately move the temperature of the cooking medium from various temperatures below the setpoint temperature to a temperature at or above the setpoint temperature, and thereafter maintain the cooking medium at a temperature around the setpoint temperature.

The present invention addresses the foregoing and other problems, and is directed to an electronic control system and more specifically to an electronic control system having a programmable microcontroller and associated peripherals, for use with heating apparatus, such as fryers, ovens, pressure cookers, pasta cookers, holding cabinets, furnaces, and water heaters.

SUMMARY OF THE INVENTION

According to the present invention there is provided a temperature control system for a heating apparatus having input means for establishing a setpoint temperature for a medium, heating means for heating the medium, sensing means for determining the temperature of the medium and control means for controlling the amount of heat provided to the medium by the heating means. The control means causes the heating means to generate a move-to-idle pulse of heat having a move-to-idle pulse duration sufficient to bring the medium to a temperature above the setpoint temperature from a move-to-idle temperature which is below the setpoint temperature. The control means derives the move-to-idle pulse duration from thermal characteristics of the heating apparatus and the medium obtained during an earlier operating mode.

According to another aspect of the present invention there is provided a method for heating a medium to a desired setpoint temperature comprising the steps of establishing a setpoint temperature for the medium, determining thermal characteristics of the heating apparatus and the medium during a first mode of operation, wherein the thermal characteristics establish an idle-on pulse duration for raising the temperature of the medium a first amount. The method further includes the step of generating at a move-to-idle temperature a move-to-idle pulse of heat having a move-to-idle pulse duration sufficient to raise the temperature of the medium above the setpoint temperature. The move-to-idle pulse duration is derived from the idle-on pulse duration and the deviation between the setpoint temperature and the move-to-idle temperature.

In accordance with another aspect of the present invention, there is provided a method for heating a medium in a heating apparatus comprising establishing a setpoint temperature for the medium, determining thermal characteristics of the heating apparatus and the medium during a first mode of operation, wherein the thermal characteristics establish an idle-ON pulse duration for raising the temperature of the medium a first amount, and generating at a move-to-idle temperature a move-to-idle pulse of heat having a move-to-idle pulse duration. The move-to-idle pulse duration is sufficient to raise the temperature of the medium to a temperature above the setpoint temperature, and the move-to-idle pulse duration is derived from the idle-ON pulse duration and the deviation between the setpoint temperature and the move-to-idle temperature.

In accordance with another aspect of the present invention, there is provided a temperature control system for heating a medium in a heating apparatus comprised of means for determining thermal characteristics of the heating apparatus and the medium in a first mode of operation, and means for adjusting the temperature of the medium in accordance with the thermal characteristics in a second mode of operation, wherein the means for adjusting raises the medium temperature above a predetermined temperature.

In accordance with another aspect of the present invention, there is provided a method for controlling the heating of a medium in a heating apparatus comprising determining thermal characteristics of the heating apparatus and the medium, in a first mode of operation, and adding heat to the medium in accordance with the thermal characteristics, in a second mode of operation, wherein the temperature of the medium is raised above a predetermined temperature.

In accordance with another aspect of the present invention, there is provided a temperature control system for heating a medium comprising a heating element for heating the medium, a temperature sensor for determining the temperature of the medium, and a controller for controlling the heating element. The controller has a first operating mode for establishing a first steady state operating condition, wherein a first pulse of heat of known duration is determined to effect a desired temperature change by the medium, the temperature change and the first pulse being indicative of the thermal response characteristics of the cooking medium at that time. The controller has a second operating mode for generating a second pulse of heat to effect a temperature rise in the cooking medium from a first temperature to a second temperature, the duration of the second pulse of heat being determined by the first pulse of heat and the desired temperature rise.

In accordance with another aspect of the present invention, there is provided a temperature control system for a heating apparatus comprising an input device for establishing a setpoint temperature for a medium, a heating device for heating the medium, a sensing device for determining the temperature of the medium, and a controller for controlling the amount of heat provided to the medium by the heating device. The controller causes the heating device to generate a move-to-idle pulse of heat having a move-to-idle pulse duration sufficient to bring the medium to a temperature above the setpoint temperature from a move-to-idle temperature which is below the setpoint temperature. The controller extrapolates an appropriate move-to-idle pulse duration from a plurality of move-to-idle pulse duration values and a plurality of corresponding medium temperature rise values.

In accordance with another aspect of the present invention, there is provided a method for heating a medium in a heating apparatus comprised of establishing a setpoint temperature for the medium, storing a table of data including a plurality of move-to-idle pulse duration values and a plurality of corresponding medium temperature rise values, extrapolating from the table of data a move-to-idle pulse duration for a move-to-idle temperature, wherein the move-to-idle pulse duration is sufficient to raise the temperature of the medium to a temperature above the setpoint temperature, and generating a pulse of heat having said move-to-idle pulse duration.

In accordance with another aspect of the present invention, there is provided a method of heating a medium in a heating apparatus comprising the steps of: controlling a heating device to establish a steady state operation, wherein periodic pulses of heat maintain the temperature within a predetermined range of temperatures, and wherein each of the pulses of heat produces a generally similar change in the temperature of said medium, determining from the steady state operation a thermal characteristic of the medium, and generating a pulse of heat of specific duration to raise the temperature of the medium from a first temperature to a second temperature, wherein the specific duration is determined based upon the thermal characteristic of the medium.

It is an object of the present invention to provide an electronic control system for a heating apparatus.

It is another object of the present invention to provide an electronic control system as described above which provides accurate temperature control with minimized wear of heating element components.

It is another object of the present invention to provide an electronic control system as described above which minimizes the number of times the heating element is pulsed during an idle mode and consequently minimizes wear on heating element components.

It is another object of the present invention to provide an electronic control system, as described above, which establishes a steady state operation during the idle mode.

It is another object of the present invention to provide an electronic control system, as described above, which adapts to the then existing conditions of the heating apparatus and the surrounding environment during operation of the idle mode.

It is another object of the present invention to provide an electronic control system as described above for controlling the temperature of a cooking medium in a deep fat fryer.

It is a further object of the present invention to provide an electronic control system as described above which maintains the temperature of the cooking medium about a preselected setpoint temperature in the idle mode.

It is a further object of the present invention to provide an electronic control system as described above having a move-to-idle mode of operation for changing the temperature of the cooking medium from a temperature below the setpoint temperature to a temperature above the setpoint temperature.

It is a further object of the present invention to provide an electronic control system as described above which utilizes a single pulse of heat in the move-to-idle mode to change the temperature of the cooking medium from a temperature below the setpoint temperature to a temperature above the setpoint temperature.

It is a further object of the present invention to provide an electronic control system as described above wherein the single pulse of heat utilized in the move-to-idle mode is determined by the thermal characteristic of the fryer and cooking medium.

It is another object of the present invention to provide an electronic control system for a heating apparatus which maintains the temperature of a heated medium based upon thermal characteristics of the heating apparatus and medium.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof and wherein:

FIG. 3 is a time/temperature graph illustrating a melt-mode, post-melt mode and subsequent idle mode;

FIG. 4 is a time/temperature graph illustration of an idle mode in which the cooking medium temperature varies symmetrically about a setpoint temperature;

FIG. 5 is a time/temperature graph illustrating a cook mode; and

FIGS. 6A, 6B and 6C show a flow chart for a preferred embodiment of the idle mode.

FIG. 9 is a flow diagram of the control process.

DETAILED DESCRIPTION

Figure 1:
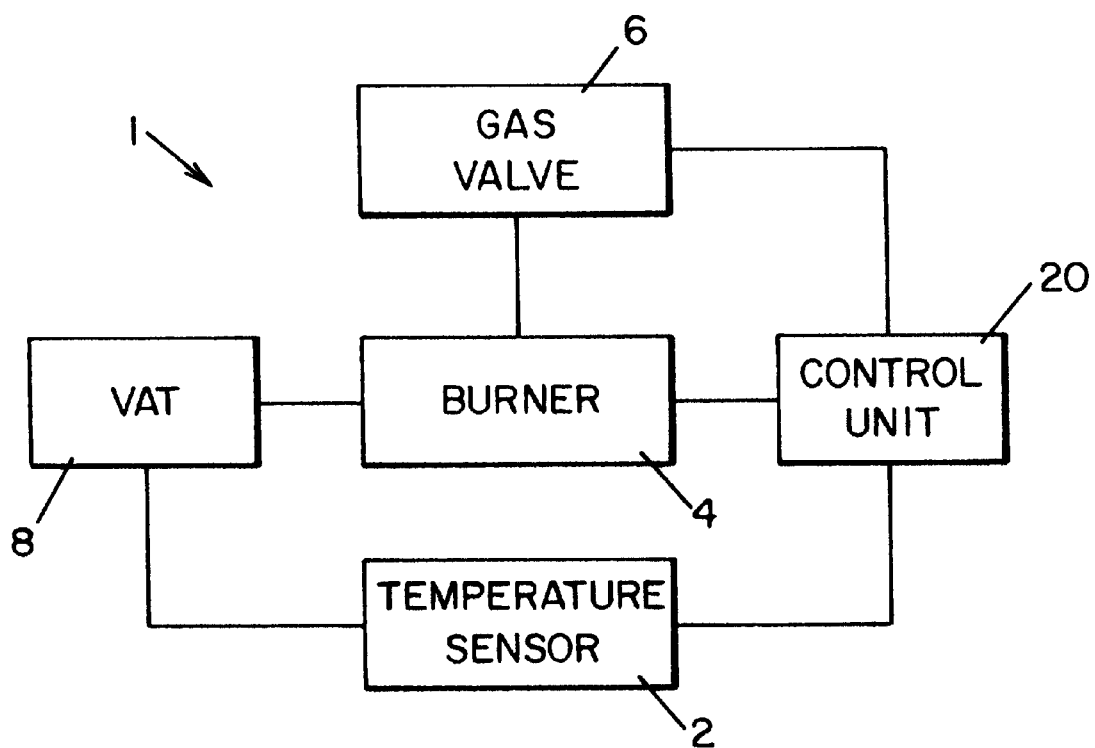
FIG. 1 is a block diagram of a deep fat fryer arrangement.

Referring now to the drawings wherein the showing is for the purpose of illustrating a preferred embodiment of the invention only, and not for the purpose of limiting same, FIG. 1 shows a block diagram of a deep fat fryer 1 comprising a temperature sensor 2, a gas burner 4, a gas valve 6, a vat 8 and a control unit 20. It should be appreciated that other types of heating elements can be used in place of the gas burner and gas valve, including an electric element.

Figure 2:
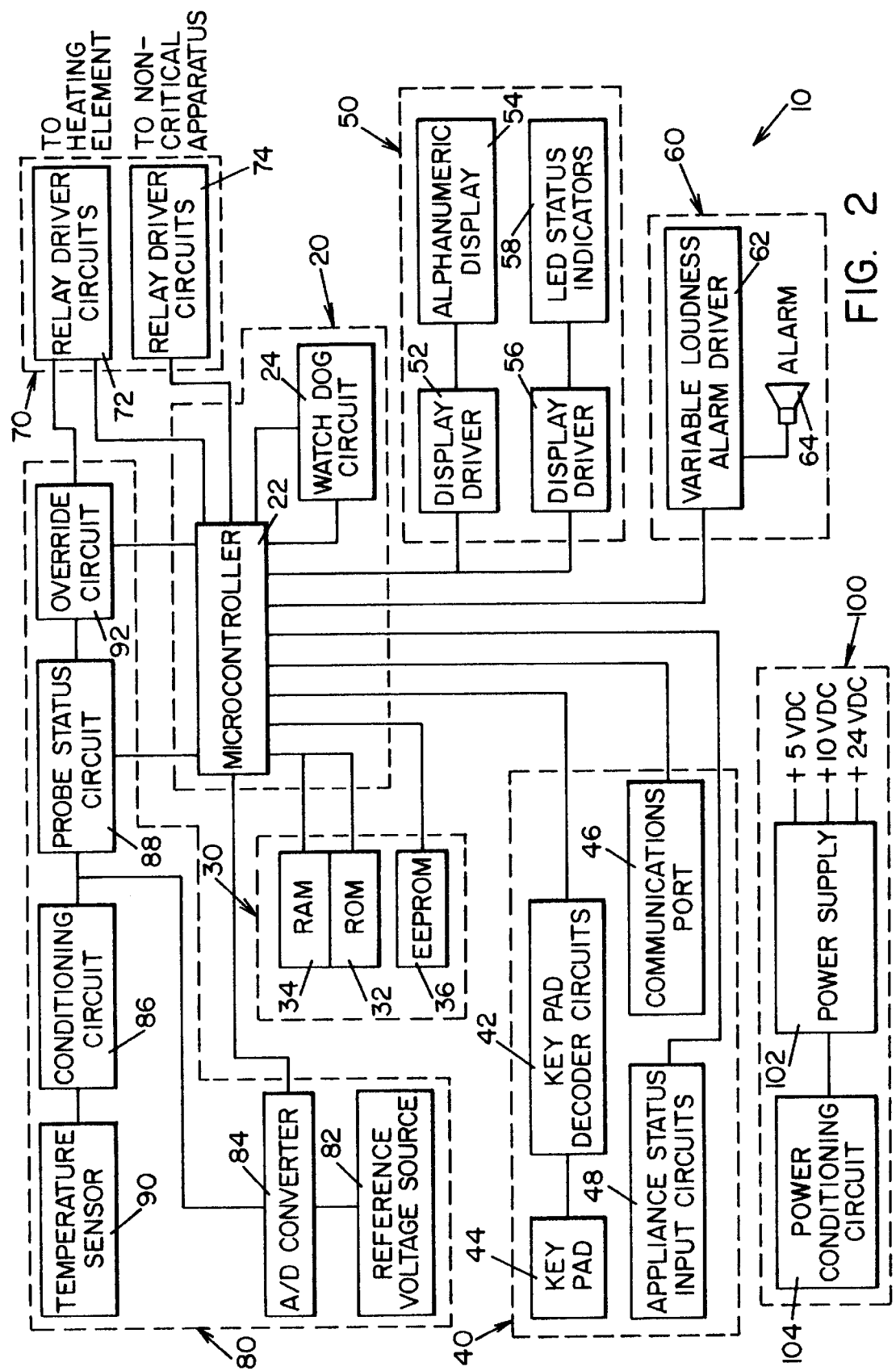
FIG. 2 is a block diagram of a fryer controller disclosing a preferred embodiment of the present invention.

FIG. 2 shows a block diagram of fryer controller 10 illustrating a preferred embodiment of the present invention. It should be appreciated that while the preferred embodiment of the present invention relates to a controller for a deep fat fryer, the present invention is also contemplated for use with other heating apparatus.

Fryer controller 10 is generally comprised of a control unit 20, a memory subsystem 30, an input subsystem 40, a display subsystem 50, an alarm subsystem 60, an output subsystem 70, a temperature sensing subsystem 80, and a power subsystem 100.

Control unit 20 is comprised of a microcontroller 22 and a watchdog circuit 24. Microcontroller 22 acts as the central "brain" of the fryer controller system. In this respect, it manages all temperature control and timing functions. Preferably, microcontroller 22 is an 80C32 microcontroller manufactured by Intel Corporation. Watchdog circuit 24 is a monitoring circuit which assures, as much as possible, that microcontroller 22 is functioning properly. In this respect, watchdog circuit 24 is reset by microcontroller 22 every $\frac{1}{10}$ of a second. If watchdog circuit 24 fails to receive a reset signal from microcontroller 22, the watchdog timer will reset microcontroller 22. It will also be appreciated that control unit 20 can also be configured without watchdog circuit 24.

Memory subsystem 30 is comprised of a ROM 32, a RAM 34 and an EEPROM 36. ROM 32 provides program instructions to microcontroller 22. RAM 34 stores temporary data such as current temperature, time left to cook, etc., while EEPROM 36 stores changeable setup data provided by the operator or manufacturer. However, unlike RAM 34, EEPROM 36 retains information even when the fryer controller is turned off.

Input subsystem 40 is comprised of keypad decoder circuits 42, a keypad 44, a communications port 46 and appliance status input circuits 48. Keypad decoder circuits 42 decode signals generated by keypad 44 and transmit the decoded signals to microcontroller 22. Keypad decoder circuits 42 reduce the number of input lines required by microcontroller 22 to receive data from keypad 44. In addition, decoder circuits 42 also provide electrostatic discharge (ESD) protection. Keypad 44 is preferably a four-by-four type keypad matrix, which is used by the operator to input data to microcontroller 22.

Communications port 46 is used to program microcontroller 22 with programmable features such as times and temperature. This data is typically stored in EEPROM 36.

Appliance status input circuits 48 receive status signals from external valves and switches (e.g., a drain valve interlock, door interlocks, an ON/OFF switch, and a gas pressure switch), and feeds the signals to microcontroller 22, preferably via optocoupled inputs.

Display subsystem 50 is comprised of display drivers 52 and 56, an alphanumeric display 54, and LED status indicators 58. Display driver 52 and display driver 56 drive alphanumeric display 54 and LED status indicators 58, respectively, by conditioning low level outputs from microcontroller 22. Alphanumeric display 54 is preferably an 8 or 16 character, 14 segment LED display, which communicates messages to the operator from microcontroller 22. LED status indicators 58 are single LEDs which indicate the status of a system component and inform the operator whether a particular function has been invoked.

Alarm subsystem 60 is comprised of a variable loudness alarm driver 62 and an alarm 64. Variable loudness alarm driver 62 is pro by decoding output from microcontroller 22 to change the volume of alarm 64. Alarm 64 is used by microcontroller 22 to alert the operator of the existence of a particular condition. Preferably, alarm 64 is comprised of a piezoelectric buzzer.

Output subsystem 70 is comprised of relay driver circuits 72 and relay driver circuits 74. Relay driver circuits 72 drive relays which turn the heating element on and off. Relay driver circuits 74 drive relays which control non-critical apparatus of the fryer, such as automated basket lifts.

Temperature sensing subsystem 80 is comprised of a reference voltage source 82, an analog-to-digital (A/D) converter 84, a conditioning circuit 86, a probe status circuit 88, a temperature sensor 90 and an override circuit 92. Reference voltage source 82 provides a 3.2 volt steady voltage for calibrating analog circuits. In this respect, A/D converter 84 converts the analog voltage of reference voltage source 82 to a digital value usable by microcontroller 22. This digital value provides a reference value for calibrating temperature sensor 90. Temperature sensor 90 provides temperature readings inside the vat. The signal provided by temperature sensor 90 is conditioned by conditioning circuit 86 and fed to microcontroller 22 through A/D converter 84. Conditioning circuit 86 provides excitation for temperature sensor 90, and provides linearization and amplification of the output signal of temperature sensor 90. Probe status circuit 88 also receives the conditioned signal from conditioning circuit 86 and determines whether temperature sensor 90 has failed (e.g., an open probe circuit, or a shorted probe circuit). If probe status circuit 88 determines that temperature sensor 90 has failed, then override circuit 92 will send a signal to relay driver circuits 72 to turn off the heating element. Likewise, if an excessively high temperature is sensed by temperature sensor 90, override circuit 92 will send a signal to relay driver circuits 72 to turn off the heating element. Accordingly, override circuit 92 operates independently of microcontroller 22 to prevent hazardous conditions.

Power subsystem 100 provides the power required by the components of the fryer controller and is comprised of a power supply 102 and a power conditioning circuit 104. Power supply 102 supplies power to the electrical components of the fryer controller, while power conditioning circuit 104 prevents electrostatic discharge, lightning and other destructive energy from reaching the electrical components.

According to the present invention, the fryer controller provides six different modes of operation with respect to temperature control. It should be noted that the names given to each mode have been selected solely for the purpose of illustration, and are not intended to limit the scope of the invention.

The first mode shall be referred to as the "pre-melt mode." In the pre-melt mode the controller determines whether the cooking chamber (i.e., vat) is empty (i.e., filled with air) or filled with liquid or solid shortening.

The second mode of operation will be referred to as the "melt mode" during which the liquid or solid shortening, which are presumably in the cooking chamber, will be heated at an appropriate rate.

The next mode of operation will he referred to as the "post-melt mode." During this mode, the temperature of the cooking medium is allowed to rise quickly towards the operator selected setpoint temperature. Furthermore, during this mode it is determined whether the cooking chamber contains water rather than shortening. If it is determined that the cooking chamber is filled with water, the boil mode is automatically entered.

The pre-melt mode, melt mode, and post-melt mode, together comprise a "start-up cycle." The mode of operation directly following the start-up cycle will be referred to as the "idle mode." During this mode of operation, the temperature of the cooking medium is stabilized around the setpoint temperature. The controller will operate in this mode of operation until a cooking operation is initiated by the operator, by pressing a function key on keypad 44. At this time, the controller will enter a mode which will be referred to as a "cook mode." During the cook mode food product introduced into the cooking medium is cooked.

An additional operating mode, which will be referred to as the "boil mode," is used for a cleaning operation, as discussed above.

Pre-melt Mode

The pre-melt mode will begin once the fryer is powered up. The controller will use a default setting stored in memory to determine the type of melt operation to perform. The type of melt operations consist of a "liquid melt" operation, a "solid melt" operation, or a "no melt" operation. A liquid melt operation signifies that the medium in the cooking chamber is liquid shortening, while a solid melt operation signifies that the medium in the cooking chamber is solid shortening. A "no melt" operation signifies that the medium in the cooking chamber does not require a melt mode and consequently that the melt mode should be skipped. Therefore, if the "no melt" operation is indicated the controller will go from the pre-melt mode to the post-melt mode, provided that a hazardous condition has not been detected during the pre-melt mode. The default setting for the melt operation is changeable by the operator after the fryer has been powered up.

During the pre-melt mode the controller will determine whether the cooking chamber is empty or whether it contains liquid or solid shortening.

To determine whether the cooking chamber is empty or filled with liquid shortening, the current temperature of the medium in the cooking chamber is determined and stored in memory. The controller then turns on the heating element for a first predetermined period of time (e.g., a pulse of heat having a duration of approximately 20–40 seconds). The controller then turns off the heating element for a second predetermined period of time (e.g., 30–60 seconds). After the second predetermined period of time has elapsed, the controller once again determines the current temperature of the medium in the cooking chamber. This current temperature is compared to the previously stored temperature. If the current temperature exceeds the stored temperature by a predetermined amount (e.g., 15° F.), then the controller determines that the cooking chamber is empty (i.e., filled with air). Likewise, if the present temperature does not exceed the stored temperature by the predetermined amount, then the controller determines that the cooking chamber contains liquid shortening. During the post-melt mode (described in detail below), the controller will determine whether a medium detected as liquid shortening is actually water.

Once the controller has detected that the cooking chamber is empty it can take corrective action, such as displaying "VAT EMPTY" on alphanumeric display 54, sounding alarm 64, and/or locking up microcontroller 22, such that power to microcontroller 22 must be terminated and then restored before it is again operational.

In determining whether the cooking chamber contains solid shortening, it is noted that solid shortening will respond to heat by rising in temperature more quickly than liquid shortening. When heat is discontinued, the temperature of solid shortening will drop quickly in temperature, whereas air will drop in temperature more slowly. Accordingly, based upon the foregoing thermal characteristics, in a manner similar to detecting liquid shortening, the controller can detect whether the medium in the cooking chamber is solid shortening.

In an alternative approach to determining whether the cooking chamber is empty or filled with liquid or solid shortening, the controller will turn on the heating element for a predetermined period of time, long enough to cause a rise in the temperature of the medium in the cooking chamber by a preprogrammed amount. The time for the temperature to rise the preprogrammed amount will be measured. The controller will then enter a programmed OFF period, during which period it will measure the time that transpires as the temperature of the medium in the cooking chamber falls by a preprogrammed amount. The total time for the temperature of the cooking chamber contents to rise and fall will differ depending on the properties of the medium. In this respect, due to the added factor of the latent heat of fusion, solid shortening will have a different rise-fall time than that of liquid shortening. Likewise, an empty cooking chamber will also be discernably different due to the absence of any matter other than air. Accordingly, this alternative procedure allows the controller to identify whether the cooking chamber is empty or filled with liquid or solid shortening prior to entering the melt mode.

If the controller, using the approaches discussed above, determines that the medium in the cooking chamber is a different type than the type signified, the controller can take any of several actions. Among these, the controller can alert the operator that there is a discrepancy and require some action from the operator, or the controller can take independent action, such as shutting down or changing to the appropriate type of melt operation.

Melt Mode

During the melt mode, the controller causes the heating element of the fryer to generate pulses of heat of uniform duration and duty cycle, until the cooking medium reaches a predetermined temperature (i.e., the "melt release temperature"). The melt release temperature is typically 150° F.–180° F.

If a solid melt operation has been specified, the heating during the melt mode will be very gradual. For example, the pulse of heat may be ON for eight seconds with a period of 30 seconds. If a liquid melt operation has been specified, the heating of the cooking medium will be less gradual. For example, the heat pulse may have a duration of 16 seconds with a period of 30 seconds. Accordingly, different duty cycles can be used for different types of cooking mediums. If a "no melt" operation has been specified, then the entire melt mode will be skipped, and the controller will go from the pre-melt mode to the post-melt mode. In this case, the cooking medium will be heated very rapidly.

Once the cooking medium has reached the melt release temperature, the melt mode ends, since the cooking medium will now be an effective heat sink, which protects against isolated hot spots in the fryer and also prevents the cooking medium itself from overheating. Accordingly, during the melt mode, the temperature of the cooking medium gradually rises.

Post-Melt Mode

As discussed above, once the cooking medium has reached the melt release temperature, the controller begins operating in a post-melt mode. During the first portion of the post-melt mode, the heating element is continuously on (i.e., full ON). As a safety feature, the controller will monitor the temperature of the cooking medium and determine whether the temperature of the cooking medium has stopped rising at approximately 200° F.–220° F. (i.e., the temperature range that is associated with the boiling point of water over normal altitude variations). Accordingly, if the temperature of the cooking medium stops rising within this temperature range and remains stable for a predetermined period of time, the controller will intelligently ascertain that the medium in the cooking chamber comprises water rather than a cooking medium such as shortening. Therefore, the controller can provide safe operation of the equipment by automatically changing from the post-melt mode to a boil mode, which will be described in detail below. The controller does this without operator intervention and makes the change-over known to the operator by visual and/or audible means.

As stated above, the heating element is continuously on during the first portion of the post-melt cycle. This allows the temperature of the cooking medium to be quickly brought up close to the operator selected setpoint temperature. Once the controller determines that the temperature of the cooking medium has reached a pre-programmed threshold temperature (which is below the operator selected setpoint temperature), the heating element is turned off for the remainder of the post-melt mode. This pre-programmed threshold temperature is kept in the controller's non-volatile memory and represents a specific temperature offset from the operator selected setpoint temperature. When this threshold temperature is reached, the heating element is turned off, and the cooking medium temperature is allowed to coast toward the setpoint temperature. It should also be noted that the threshold temperature is alternatively referred to as the "cutoff temperature" since the heating element is "cutoff" at this temperature.

The threshold temperature may be adjusted following each start-up cycle. In this respect, when the temperature of the cooking medium stops increasing after the heating element has been turned off at the threshold temperature, the controller remembers the peak temperature reached after the turn off and calculates the deviation from the operator selected setpoint temperature. If the deviation is within a pre-programmed acceptable band about the setpoint temperature (e.g., the setpoint temperature +/−2° F.), the controller will not adjust the threshold temperature for the subsequent start-up cycle. However, if the deviation falls outside the pre-programmed acceptable band, the controller will adjust accordingly the threshold temperature for the subsequent start-up cycle. For example, the difference between the peak temperature and the setpoint temperature is added to or subtracted from a current threshold temperature to obtain an adjusted threshold temperature. This adjusted threshold temperature will be used during the subsequent start-up cycle.

The net effect of the foregoing action is to continuously adapt the threshold temperature based upon the results obtained during the preceding start-up cycle. Accordingly, the threshold temperature is adjusted for a subsequent start-up cycle, only if and when the peak temperature reached after the turn off during the previous start-up cycle falls outside the pre-programmed acceptable band about the setpoint temperature. In the event that this compensation is such that it begins to approach an unrealistic condition, the controller will alert the operator that the fryer is malfunctioning.

Alternatively, the threshold temperature can be shifted up or down by some amount proportional to the rate of rise of the cooking medium temperature. For example, if the controller has in its memory a value for the nominal rate of temperature rise and the actual measured value is less than this nominal value, then the controller can move the threshold temperature closer to the setpoint temperature by an amount proportional to the difference in the actual measured rate from that of the nominal. The opposite would occur in the case where the actual measured rate is greater than the nominal, although in practice the former is more often the case.

If the peak temperature reached, after the heating element is turned off, exceeds the setpoint temperature, the heating element will remain off until the temperature falls to the setpoint temperature. However, the idle mode, which is explained in detail below, will begin once the peak temperature has been reached.

If the peak temperature reached is below the setpoint temperature then a move-to-idle algorithm becomes operational. The move-to-idle algorithm provides a single pulse of heat which has a long enough duration (e.g., 40 seconds) to cause the temperature of the cooking medium to rise above the setpoint temperature. The heating element is then turned off and remains off until the temperature of the cooking medium falls to the setpoint temperature. As noted above, the idle mode begins once the peak temperature above the setpoint temperature is reached.

Idle Mode

During the idle mode, the controller causes the heating element to keep the temperature of the cooking medium within a range of temperatures (i.e., a control band defined by Tmin and Tmax) around the setpoint temperature. In a preferred embodiment of the present invention, the temperature control algorithm for the idle mode gives the operator the ability to program an acceptable temperature range about the setpoint temperature for the cooking medium temperature.

In an alternative embodiment of the present invention, the time interval between the start of any two pulses of heat may be programmed (e.g., by the operator), and thereby obtain whatever peak-to-valley excursions that will occur as a result thereof. The controller will automatically adapt to the physical system that it is controlling, forcing whatever temperature excursions that are necessary so as to achieve the correct interval between pulses of heat. In this respect, if the time interval between two pulses of heat exceeds the programmed time interval, then the duration of the pulse is decreased. If the time interval between two pulses of heat is less than the programmed time interval, then the duration of the pulse is increased.

Accordingly, the controller either measures the peak-to-valley excursion of the cooking medium temperature about the setpoint temperature and then makes a correction to the duration of the heat pulse, or the controller times the interval between the start of pulses of heat and then makes a correction to the duration of the heat pulse. In either case, the correction to the duration of the heat pulse is made only once per cycle each time the pulse occurs.

While initially the heating element will be pulsed when the cooking medium temperature crosses the setpoint temperature (i.e., crosses from a temperature above the setpoint temperature to a temperature below the setpoint temperature), once the peak-to-valley temperature swings are stabilized, the asymmetry about the setpoint temperature is evaluated. The temperature at which the heating element is pulsed is then adjusted (i.e., lowered or raised) in order to obtain peak-to-valley temperature excursions which are symmetrical about the operator selected setpoint temperature. The adjusted temperature is referred to as the "adjusted idle ON setpoint temperature." Accordingly, the heating element will be pulsed when the cooking medium temperature crosses the adjusted idle ON setpoint temperature (i.e, crosses from a temperature above the adjusted idle ON setpoint temperature to a temperature below the adjusted idle ON setpoint temperature).

If the temperature at which the heat pulse occurs is not adjusted for symmetry, there would be a tendency for the peak-to-valley temperature excursions to occur asymmetrically about the operator selected setpoint temperature, thus giving an appearance of operation at a temperature other than that selected by the operator.

Move-to-Idle Mode

At times during the operation of fryer controller 1, it may be necessary to return the temperature of the cooking medium to above the setpoint temperature and to the idle mode of operation from a temperature below the setpoint temperature. For example, in the post melt mode as discussed supra, the temperature of the cooking medium, after the heating element is turned OFF, may peak before reaching the setpoint temperature. In this case, a move-to-idle algorithm, discussed supra, provides a single pulse of heat of sufficient duration to cause the temperature of the cooking medium to rise above the setpoint temperature. In addition to this situation, other situations arise wherein it is desirable to return the temperature of the cooking medium to above the setpoint temperature from a temperature below the setpoint temperature. For example, it is not unusual for the temperature of the cooking medium to be below the setpoint temperature after a cook operation has been performed. It is therefore desirable to return the temperature of the cooking medium to the setpoint temperature before beginning another cooking operation. Another common situation is where the cooking medium is stirred, causing a drop in its temperature. Again, it is desirable to return the temperature of the cooking medium to above the setpoint temperature before initiating a cooking operation. In each of the foregoing situations, it is desirable that the fryer controller return the temperature of the cooking medium to above the setpoint temperature as quickly as possible, but without significantly overshooting the setpoint temperature.

According to another aspect of the present invention, a move-to-idle mode of operation is provided wherein a single pulse of heat is provided to return the temperature of a cooking medium to above the setpoint temperature from some temperature below the setpoint temperature. According to this aspect of the present invention, the pulse of heat, referred to hereinafter as the "MOVE-TO-IDLE PULSE" is derived from the IDLE-ON PULSE established during the idle mode operation.

As discussed above, a controller according to the present invention is operable, during the idle mode, to measure the peak-to-valley temperature excursions of the cooking medium about a setpoint temperature, and to modify the duration of a heat pulse to maintain the temperature of the cooking medium within a desired range about the setpoint temperature. The desired range is defined by temperatures designated $T_{MAX}$ and $T_{MIN}$ and is referred to as the CONTROL BAND. By modifying the heat pulses to maintain the temperature of the cooking medium within the desired range about the setpoint, the fryer controller "adapts" to the particular cooking conditions then existing, including the type of cooking medium, the volume of the cooking medium, the heat output of the burner, and any external environmental conditions. In other words, the fryer controller establishes a steady state operation for the then existing conditions. The steady state operation is generally indicative of the fryer's dynamic thermal characteristics at that time. More specifically, the IDLE-ON PULSE is indicative of the thermal characteristics of the fryer system and the cooking medium at that time. By modifying the duration of the heat pulses to maintain the temperature of the cooking medium within the fixed temperature range (i.e., within the control band), a known temperature rise in the cooking medium is associated with the IDLE-ON PULSE. Stated another way, the IDLE-ON PULSE establishes a known change in temperature in the cooking medium, and this relationship may be used to determine the duration of a pulse of heat necessary to produce a desired rise in the temperature of the cooking medium.

According to one aspect of the present invention, fryer controller 1 utilizes the learned thermal characteristics of the particular fryer system determined in the idle mode operation to control changes in the temperature of the cooking medium in the move-to-idle mode.

According to a preferred embodiment of the present invention, the duration of the MOVE-TO-IDLE PULSE is determined by the following equation:

$$MTIP = \text{integer}\left[(IOP)\left(1 + \frac{T_{SETPOINT} - T_{MTI}}{K}\right)\right]$$

where

MTIP is the duration in seconds of the MOVE-TO-IDLE PULSE,

IOP is the duration in seconds of the IDLE-ON PULSE, $T_{SETPOINT}$ is the setpoint temperature, $T_{MTI}$ is the temperature of the cooking medium when the MTIP is determined and initiated, and K is the change in temperature of the cooking medium resulting from one (1) IDLE-ON-PULSE.

The foregoing equation has been derived based upon the understanding that a pulse of heat having a duration of the IDLE-ON PULSE will raise the temperature of the cooking medium by a known number of degrees. The change in temperature of the cooking medium resulting from the IDLE-ON PULSE establishes the value K in the foregoing equation.

According to one embodiment of the present invention, the value of K may be established by the control band. Since the idle mode forces the temperature swings between $T_{MAX}$ and $T_{MIN}$ (which is the control band), the difference between these values is preferably used as the constant K. Once the IDLE-ON PULSE has stabilized in the idle mode, one IDLE-ON PULSE produces a temperature swing equal to the control band. Thus, the difference in temperature between the setpoint ($T_{SETPOINT}$) and the temperature of the cooking medium when the move-to-idle mode is to be initiated ($T_{MTI}$), is divided by the temperature swing (K) produced by one IDLE-ON PULSE. As seen in the above equation, the numerical value "1" is added to the value derived from $T_{SETPOINT}$ minus $T_{MTI}/K$. Adding "1" to the equation basically adds an additional IDLE-ON PULSE to the MOVE-TO-IDLE PULSE determined by the equation. This additional IDLE-ON PULSE is added to ensure that the MOVE-TO-IDLE PULSE will be of sufficient duration to force the temperature of the cooking medium to exceed the setpoint temperature. In the foregoing equation, the term "integer" indicates that the MOVE-TO-IDLE PULSE is a whole number multiple of the IDLE-ON PULSE. It will of course be appreciated that fractional values could also be calculated.

The foregoing equation thus determines the duration of the MOVE-TO-IDLE PULSE required to force the temperature of a cooking medium having a temperature at $T_{MTI}$ to move the temperature of the cooking medium to the setpoint temperature. In other words, based upon the temperature difference between the temperature of the cooking medium and the setpoint temperature when the move-to-idle mode is initiated, the MOVE-TO-IDLE PULSE is determined by some multiple of the IDLE-ON PULSE.

By way of example, if fryer controller 1 is operating with a setpoint temperature $T_{SETPOINT}$ of 340° F., the control band established by $T_{MAX}$ and $T_{MIN}$ is 4° F. and the IDLE-ON PULSE established during the idle mode to maintain the temperature of the cooking medium within the control band is determined to be 20 seconds, if the move-to-idle mode is initiated when the temperature of the cooking medium is 320° F. ($T_{MTI}$), the MOVE-TO-IDLE PULSE=integer [(20 seconds) 1+20° F./4° F.)]

MTIP=120 seconds.

The present invention thus provides a move-to-idle mode wherein fryer controller 1 can move the temperature of the cooking medium from some temperature below the setpoint temperature to a temperature above the setpoint temperature with a single pulse of heat and without significantly overshooting the setpoint. The MOVE-TO-IDLE PULSE is determined based upon the IDLE-ON PULSE established during the idle mode, which IDLE-ON PULSE is indicative of the then existing thermal characteristics of the heating apparatus and cooking medium.

In operation, it should be appreciated that the MOVE-TO-IDLE PULSE will generally be more accurate when the temperature deviation between $T_{SETPOINT}$ and $T_{MTI}$ is relatively small. As the temperature deviation between $T_{SETPOINT}$ and $T_{MTI}$ increases, the MOVE-TO-IDLE PULSE determined by the foregoing equation may produce less than desirable results. Specifically, the temperature of the cooking medium may rise above the setpoint slightly more than would be desirable. This may occur as a result of the thermal energy stored in the cooking medium during a longer pulse of heat. It is this stored thermal energy that results in a continuing rise (i.e., coasting) of the temperature of the cooking medium after the heat is turned OFF. Because of this effect, if MOVE-TO-IDLE PULSES were plotted against the resulting temperature change produced by the MOVE-TO-IDLE PULSE for a number of different temperature deviations from the setpoint, a non-linear curve would be generated. In other words, longer MOVE-TO-IDLE PULSES would produce proportionately greater temperature rises.

In accordance with another aspect of the present invention, fryer controller 1 monitors and stores the duration of each MOVE-TO-IDLE PULSE calculated according to the foregoing equation, and monitors the change in temperature resulting from such MOVE-TO-IDLE PULSE. Each time a MOVE-TO-IDLE PULSE is generated, the duration of the pulse and the resulting temperature rise are stored in memory. Once three or four sets of data values have been obtained and stored in memory, a model curve establishing the relationship of the MOVE-TO-IDLE PULSE to the resulting change in the temperature in the cooking medium can be extrapolated.

Over time, as more and more data values are obtained, the extrapolated curve will better approximate the non-linear relationship. At some point, fryer controller 1 may use the extrapolated curve to predict the necessary MOVE-TO-IDLE PULSE to generate a desired temperature rise. In this respect, fryer controller 1 may calculate a MOVE-TO-IDLE PULSE based upon the IDLE-ON PULSE as described above, and could likewise obtain a move-to-idle pulse value from the extrapolated curve. Fryer controller 1 could be programmed to select the shorter MOVE-TO-IDLE PULSE calculated by these two methods, thereby producing the desired rise in temperature with the minimum overshoot. Preferably, however, over time, enough data points would be developed, and fryer controller 1 could rely solely on the extrapolated curve to determine the MOVE-TO-IDLE PULSE.

As heretofore described, the calculation of the MOVE-TO-IDLE PULSE was based upon K being equal to the control band and the IDLE-ON PULSE being determined as the duration in seconds of a pulse of heat to establish a temperature swing equal to the control band. The foregoing parameters suggest a set value established over time. As will be appreciated, the calculation can be based upon the duration of the most recent IDLE-ON PULSE and the specific temperature change relating to such pulse. In other words, IOP and K can either be determined by an average of a steady state operation, or can be obtained from a single IDLE-ON PULSE and the resulting temperature change.

Cook Mode

It has been observed that if the heating element is turned on and remains on during a cook mode for a long period of time, or if a series of cooks are initiated, one-after-another, that there is a residual heat build-up in the system. This residual heat build-up will often result in serious overshoots of the setpoint temperature. Not only is the recovery back to the setpoint temperature affected, but the thermal characteristics of each successive cook can also be altered, thus resulting in unacceptable changes in the quality of the cooked food product. In this respect, the bottom temperature reached after a load of food product is introduced into the cooking chamber will rise as successive cooks are initiated. Accordingly, the controller of the present invention will dissipate residual heat during the cook mode.

In general, during the cook mode, the heating element will be continuously on, as long as the temperature of the cooking medium remains below a predetermined temperature that is below the setpoint temperature (e.g., a temperature 10° F. below the setpoint temperature). This predetermined temperature is referred to as the "TURN-OFF temperature." However, as noted above, the controller will dissipate built-up heat in the system. In this respect, the controller will temporarily turn off the heating element sometime during the cook mode at a temperature below the TURN-OFF temperature. Accordingly, the heating element is temporarily turned off at some time following a rise in the cooking medium temperature, after the introduction of food product, but before reaching the TURN-OFF temperature. In a preferred embodiment of the invention the controller is turned off as soon as the cooking medium temperature begins to rise (following introduction of food product to the cooking chamber) and is turned back on as soon as the temperature of the cooking medium begins to fall. In an alternative embodiment of the present invention, the heating element is turned off when the cooking medium temperature has risen to a predetermined temperature that is below the TURN-OFF temperature and remains off until the cooking medium temperature falls by a predetermined amount. Temporarily turning the heat off for some period of time during the cook mode provides the heat dissipation necessary to prevent overshoot and provide uniform cooking.

Following the dissipation of heat, the heating element will continue to be on until the temperature of the cooking medium reaches the predetermined TURN-OFF temperature which is below the setpoint temperature. The TURN-OFF temperature is determined to allow the temperature of the cooking medium to coast above the setpoint temperature (and thus re-enter the idle mode) without risking serious overshoot of the setpoint temperature. It should be noted that even if a cook timer elapses, the heating element will remain on until the predetermined TURN-OFF temperature is reached. Once a peak temperature above the setpoint temperature is reached, the controller will re-enter the idle mode. If the cooking medium temperature is unable to coast above the setpoint temperature, the heating element will be pulsed for a duration sufficient for the cooking medium to exceed the setpoint temperature.

It will also be appreciated that the present invention can alternatively be configured without the heat dissipation feature of the cook mode.

The cook mode is initiated by the operator by selecting a "product key" on keypad 44 corresponding to a particular food product (e.g., frozen french fries). A cooking time is pre-stored in memory for each food product option.

An alternative embodiment of the present invention includes an "instant-on" feature. Once a product key is depressed to begin the cook mode, the controller immediately turns the heating element on, without regard to the temperature of the cooking medium. After a period of approximately 15 seconds, the controller will evaluate whether the temperature has gone up or fallen. If the temperature has gone up, the heating element is turned off, whereas if the temperature has fallen, the heating element will remain on (i.e., continuously ON).

It will also be appreciated that automated or manual basket lifts may be used to introduce food product into the cooking medium during the cook mode. In this respect, initiation of the cook mode by the operator can be used to signal the automated basket lifts to drop into the cooking medium.

Boil Mode

The boil mode is used to periodically clean the cooking chamber of the appliance. Cleaning is performed by filling the cooking chamber with water and detergents and then heating the solution to a predetermined boil mode temperature (e.g., approximately 195° F). However, a hazardous boil-over condition can occur if a melt mode begins while water is in the cooking chamber. In this respect, after the melt release temperature has passed and continuous heat is applied, the temperature of the cooking chamber contents will exceed the boiling point of water. Accordingly, a boil-over condition can result in damage to the cooking appliance and possible injury to anyone in close proximity. Therefore, the controller of the present invention will automatically change from a melt mode to a boil mode when water is detected in the cooking chamber.

DETAILED OPERATION

Detailed operation of the controller will now be explained with reference to FIGS. 3–8.

With reference to FIG. 3, there is shown a time/temperature graph of a typical melt mode, post-melt mode and idle mode. During the melt mode, the heating element is pulsed at a constant rate, as shown at portion 302 of the heating element signal. Accordingly, the temperature of the cooking medium will gradually rise, as shown at portion 202 of the cooking medium temperature line 200. Once the temperature of the cooking medium reaches the melt release temperature of approximately 150° F.–180° F., the post-melt mode begins (see time reference A), and the heating element operates continuously on (i.e., full ON) until a modifiable cutoff temperature is reached. Accordingly, the heating element remains unconditionally ON until the modifiable cutoff temperature is reached, as indicated at portion 304 of the heating element signal. This allows the temperature of the cooking medium to quickly rise to a temperature close to the setpoint temperature selected by the operator. This is shown by portion 204 of cooking medium temperature line 200. The cutoff temperature is generally 25–35° F. below the operator's selected setpoint temperature. When the temperature of the cooking medium reaches the cutoff temperature, the heating element is turned OFF, as shown at time reference B. With the heating element turned OFF, the temperature of the cooking medium will continue to rise (due to residual heat) until it reaches a peak temperature near the setpoint temperature. The idle mode begins when the peak temperature is reached, as shown at time reference C.

Referring now to the idle mode, the heating element remains OFF, and the cooking medium temperature is allowed to coast downward until reaching the setpoint temperature. Once the cooking medium temperature changes from a temperature above the setpoint temperature to a temperature below the setpoint temperature, the heating element is pulsed (i.e., turned ON for a predetermined period of time, as shown at time reference D). Portion 306 of the heating element signal illustrates a first pulse of heat during the idle mode. This initial pulse is of predetermined duration. A control band is established above and below the setpoint temperature from, for example, 2° F. below the setpoint temperature to 2° F. above the setpoint temperature. These temperatures are referred to as Tmin and Tmax respectively. At temperatures above Tmax, the heating element is unconditionally OFF, whereas at temperatures below Tmin, the heating element is unconditionally ON. As the temperature of the cooking medium changes from a temperature above the setpoint temperature to a temperature below the setpoint temperature, the heating element is again pulsed.

As noted above, the first pulse generated during the idle mode will be of a predetermined duration. The duration of subsequent heat pulses will be varied based upon the peak-to-valley temperature difference resulting from the previous heat pulse. If the peak-to-valley temperature swing (i.e., difference) exceeds a threshold value, for example, 4° F., then the duration of the pulse is decremented. In other words, the controller monitors the highest temperature (i.e., peak) obtained as a result of a heat pulse against the lowest temperature (i.e., valley) reached before a subsequent heat pulse causes the temperature of the cooking medium to rise. Thus, the duration of each successive pulse is based upon the peak-to-valley temperature swing generated by the previous pulse. If the peak-to-valley temperature swing is less than what is desired, then the duration of the heat pulse is incremented.

Once the peak-to-valley temperature swings are stabilized, the asymmetry about the setpoint temperature is evaluated, and the temperature at which the heating element is pulsed is lowered or raised in order to obtain a peak-to-valley temperature swing approximately symmetrical about the setpoint temperature. Accordingly, the cooking medium temperature waveform is essentially shifted by adjusting the temperature at which the heating element is pulsed. As noted above, the adjusted temperature is referred to as the "adjusted idle ON setpoint temperature."

Referring now to FIG. 4, there is shown a time/temperature graph illustrating an idle mode having a symmetrical temperature swing about the operator selected setpoint temperature. A heat pulse 502 occurs as the temperature of the cooking medium (see cooking medium temperature line 400) moves from a temperature above the adjusted idle ON setpoint temperature to a temperature below the adjusted idle ON setpoint temperature. In the example shown in FIG. 4, the adjusted idle ON setpoint temperature is below the operator selected setpoint temperature in order to provide a symmetrical temperature swing about the operator selected setpoint temperature. Another heat pulse 504 occurs as the temperature of the cooking medium again changes from a temperature above the adjusted idle ON setpoint temperature to a temperature below the adjusted idle ON setpoint temperature. The system will remain in this symmetrical state until a cooking operation is initiated by the operator, and the cook mode is entered.

Referring now to FIG. 5, a time/temperature graph of a cook mode is shown. The controller operates in the idle mode until a cook mode is initiated by the operator. A cook mode is initiated by the operator at time reference A, which causes the controller to turn the heating element on, as indicated at portion 802 of the heating element signal. In response to the introduction of food product, cooking medium temperature line 600 plunges quickly beginning at time reference B. As temperature line 600 recovers and begins to rise, the heating element is turned off (as shown at time reference C). Accordingly, excess heat is dissipated. Once the cooking medium begins to drop, the heating element is turned on (as shown at time reference D) and will remain on until the TURN-OFF temperature is reached at time reference E. This is shown by portion 804 of the heating element signal. Once a peak temperature above the setpoint temperature is reached, the controller will re-enter the idle mode.

As discussed above, the idle mode can be re-entered before, during or after a cooking operation through the move-to-idle mode, that uses information about the thermal characteristics of the fryer and the cooking medium to determine the MOVE-TO-IDLE PULSE. More specifically, the duration of a MOVE-TO-IDLE PULSE is derived from the IDLE-ON PULSE using the equation set forth above. In particular, when it is desired to re-enter the idle mode, the present cooking medium temperature is determined ($T_{MTI}$) and the duration of the MOVE-TO-IDLE PULSE (MTIP) is calculated. The controller then initiates the MOVE-TO-IDLE PULSE having the calculated duration. As a result, the temperature of the cooking medium will quickly rise to a temperature slightly above the setpoint temperature ($T_{SETPOINT}$) and the controller will return to idle mode operations as described in detail above.

The controller system of the present invention also includes a boil mode during which the controller sustains the temperature at a predetermined boil mode temperature (e.g., approximately 195° F.). As discussed above, the present invention includes a safety feature in the event that water is in the cooking chamber, and a start-up cycle has been initiated. In this respect, (luring the post-melt mode, the controller monitors the temperature of the cooking medium in the cooking chamber and determines whether the temperature has stopped rising at approximately 200–220° F. (i.e., the temperature range that is associated with the boiling point of water over normal altitude variations). If the temperature has stopped rising, then it is determined that water is in the cooking chamber rather than shortening. Accordingly, the system will automatically transfer from the post-melt mode to the boil mode and drop and control the operating temperature to the predetermined boil mode temperature. This feature prevents the possibility of violent boiling of water during an intended cleaning procedure.

Figure 6A:
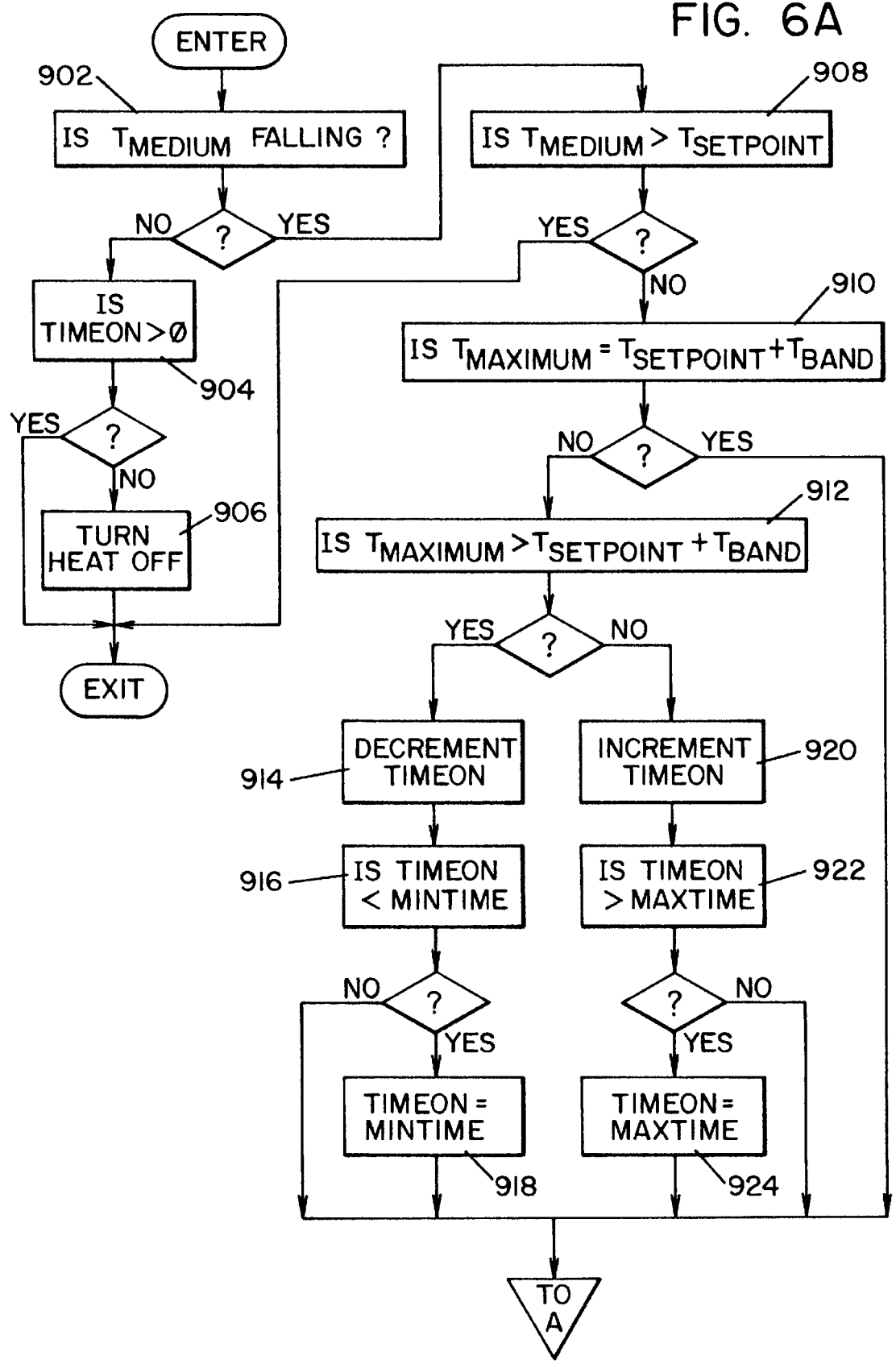
Figure 6B:
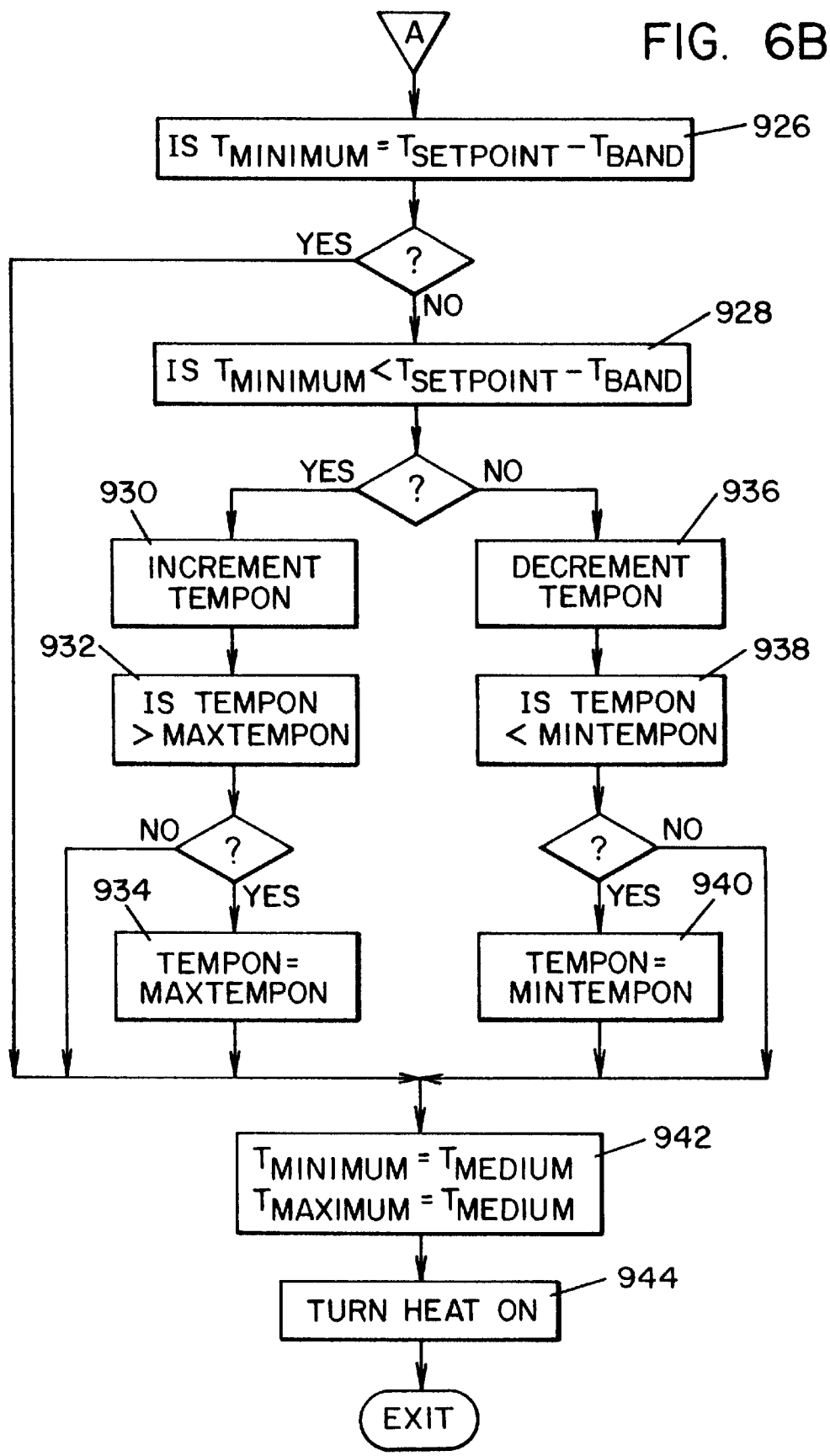

Referring now to FIGS. 6A, 6B and 6C, there is shown a flow chart for a preferred embodiment of the idle mode. Table 1 set forth below defines the terms used in the flow charts shown in FIGS. 6A, 6B, 6C and 7:

TABLE 1

| Term | Definition |
|---|---|
| $T_{MEDIUM}$ | Temperature of the cooking medium |
| $T_{SETPOINT}$ | Setpoint temperature |
| $T_{BAND}$ | One half the temperature control band |
| $T_{MAXIMUM}$ | Maximum cooking medium temperature reached during a cycle of the idle mode |
| $T_{MINIMUM}$ | Minimum cooking medium temperature reached during a cycle of the idle mode |
| TIMEON | Time duration of a pulse of heat |
| MINTIME | Minimum time duration for the pulse of heat |
| MAXTIME | Maximum time duration for the pulse of heat |
| TEMPON | Temperature at which the pulse of heat is initiated |
| MAXTEMPON | Maximum temperature at which the pulse of heat is initiated |
| MINTEMPON | Minimum temperature at which the pulse of heat is initiated |

With reference to FIG. 6A, the idle mode begins by determining whether the temperature of the cooking medium is falling (Step 902). If not, it determines whether the duration of the pulse has elapsed (Step 904). If the duration of the pulse has elapsed, the heat is turned off (Step 906) and another cycle of the idle mode algorithm is begin.

If the temperature of the cooking medium is falling, it is determined whether the temperature has crossed the setpoint temperature (Step 908). If so, then it is determined whether the maximum temperature reached is equal to the maximum temperature for the selected control band (Step 910). If this is the case, then the pulse duration is correct for the selected control band and the algorithm continues to FIG. 6B which is discussed below. If the maximum temperature reached is not equal to the maximum temperature for the selected control band, then the duration of the pulse is either decreased (Steps 914, 916 and 918) or increased (Steps 920, 922 and 924). The duration of the pulse will be set between a minimum time duration (MINTIME) and a maximum time duration (MAXTIME).

Referring now to FIG. 6B, this portion of the idle algorithm will force the peak-to-valley temperature swing of the cooking medium temperature to be symmetrical about the setpoint temperature. In this respect, it is determined whether the minimum temperature reached is equal to the minimum temperature for the selected control band (Step 926). If so, the peak-to-valley temperature swing is symmetrical. Accordingly, the variables are reset (Step 942) and the heat is turned on for the computed duration (Step 944). If the minimum temperature reached is not equal to the minimum temperature for the selected control band (Step 928) then the temperature at which the pulse of heat is initiated is increased (Steps 930, 932 and 934) or decreased (Steps 936, 938 and 940). The temperature at which the pulse of heat is initiated will be set between a minimum temperature (MINTEMPON) and a maximum temperature (MAXTEMPON).

It should be noted that in a preferred embodiment of the present invention, before performing step 928, it is determined whether the peak-to-valley temperature swings have stabilized about the setpoint temperature. If the swings have stabilized then the algorithm proceeds with step 928. If the swings have not stabilized then the algorithm proceeds with step 942. In this manner, the idle algorithm will not proceed with forcing the peak-to-valley temperature swings to be symmetrical about the setpoint temperature until the peak-to-valley temperature swings have stabilized.

Referring to FIG. 6C, there is shown an algorithm for determining the minimum and maximum temperature excursions of the cooking medium temperature. This algorithm will be executed each time a temperature reading of the cooking medium is taken. The temperature medium of the cooking medium is obtained (Step 950). If the cooking medium temperature exceeds the temperature at which a pulse of heat is initiated (Step 952), then it is determined whether a new maximum temperature has been reached (Step 954). If so, this temperature is saved as the new maximum temperature (Step 956).

If the temperature of the cooking medium is less than or equal to the temperature at which a pulse of heat is initiated (Step 952), then it is determined whether a new minimum temperature has been obtained (Step 960). If so, this temperature is saved as the new minimum temperature (Step 962).

Figure 7:
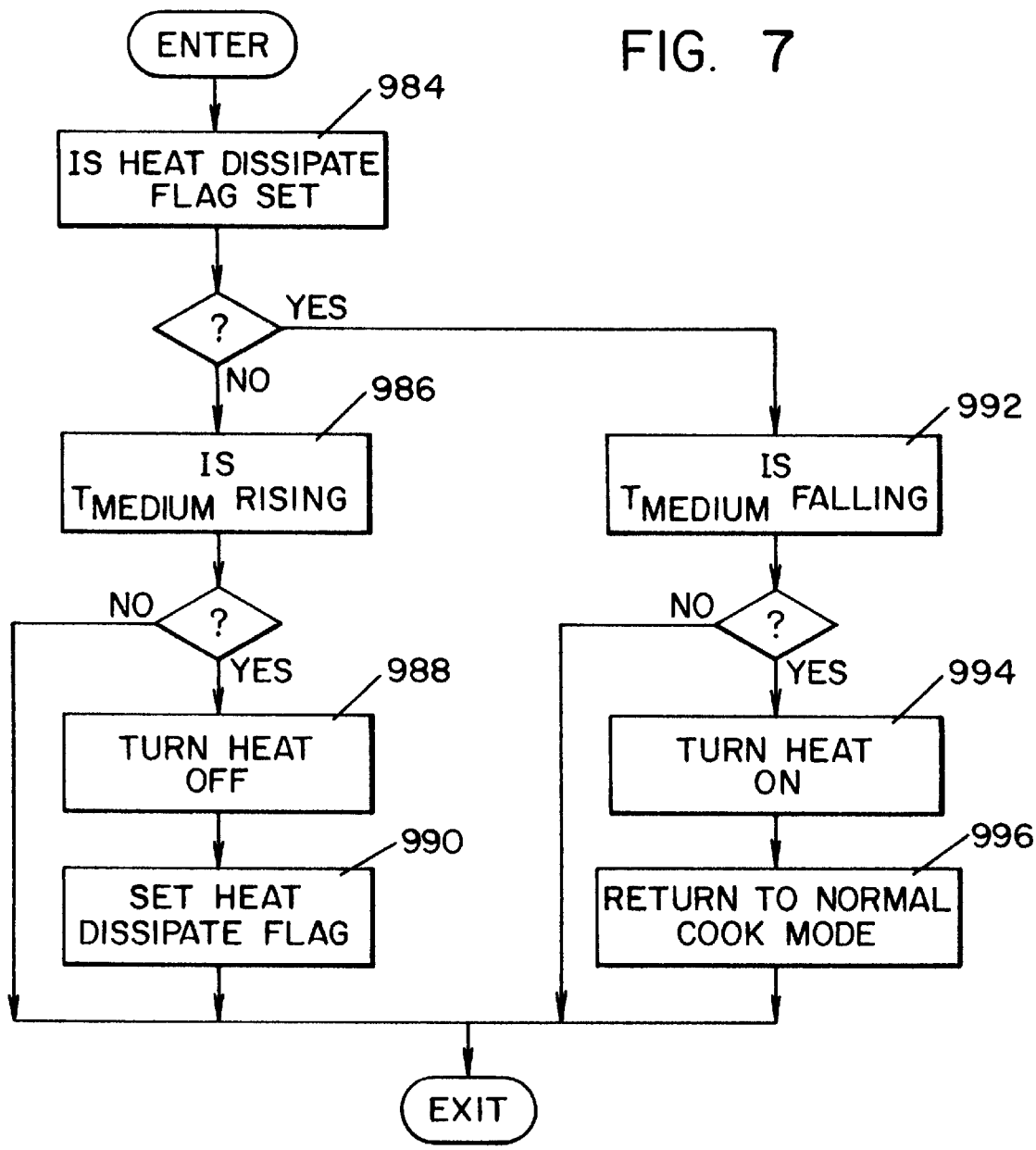
FIG. 7 shows a flow chart for a preferred heat dissipation algorithm.

FIG. 7 discloses a general heat dissipation algorithm for use during the cook mode. It is determined whether a heat dissipate flag has been set (Step 984). If not, the algorithm determines whether the temperature of the cooking medium is rising (Step 986). If the temperature of the cooking medium is rising, then the heat is turned off (Step 988) and the heat dissipate flag is set (Step 990).

If it is determined that the heat dissipate flag is set then it is determined whether the temperature of the cooking medium is falling (Step 992). If so, the heat is turned on (Step 994) and the normal cook mode is resumed (Step 996).

In summary, the heat dissipation algorithm of FIG. 7 will turn off the heat during the cook mode as soon as the temperature of the cooking medium begins to rise. The heat will remain off until the temperature of the cooking medium begins to fall. Once it begins to fall, the heat is turned back on, and a normal cook mode resumes. It will be appreciated that alternatively, the heat can be dissipated at a time later in the cook mode. For instance, the heat could be turned off after the cooking medium temperature has risen to a predetermined temperature and resume heating after the temperature of the cooking medium has dropped a predetermined number of degrees.

It should be noted that the foregoing temperature control operations can be enhanced by saving the operational parameters each time the fryer is used. In this respect, a comparison can be made between current operational parameters and previously saved operational parameters, which are used as default or starting values upon system power up. If the default and current values differ by a significant and programmable amount, then the controller will save the current values in protected memory for use as the new default values. In this manner, the controller can adapt itself to changing conditions to achieve a steady-state condition in the fastest possible time.

Cooking Time Compensation

A second aspect of the present invention relates to time compensation during the cook mode. In this respect, the preferred embodiment of the present invention employs a time compensation curve which relates temperature to a time compensation factor. Time compensation factors for a time compensation curve having a one-for-one time compensation factor at a temperature of 350° F. are stored in memory. Each time compensation factor is stored in an individual memory location. The temperature corresponding to each time compensation factor is used to provide the address of the memory location containing the corresponding time compensation factor. Accordingly, the temperature acts as a pointer to a storage location in memory containing the time compensation factor corresponding to that temperature. The stored compensation factors are used as reference data for determining time compensation factors at various measured cook medium temperatures. It should be noted that the time compensating factors of FIG. 8 have been chosen solely for the purpose of illustration. Accordingly, other time compensation factors from different time compensation curves can be utilized with similar results.

Figure 8:
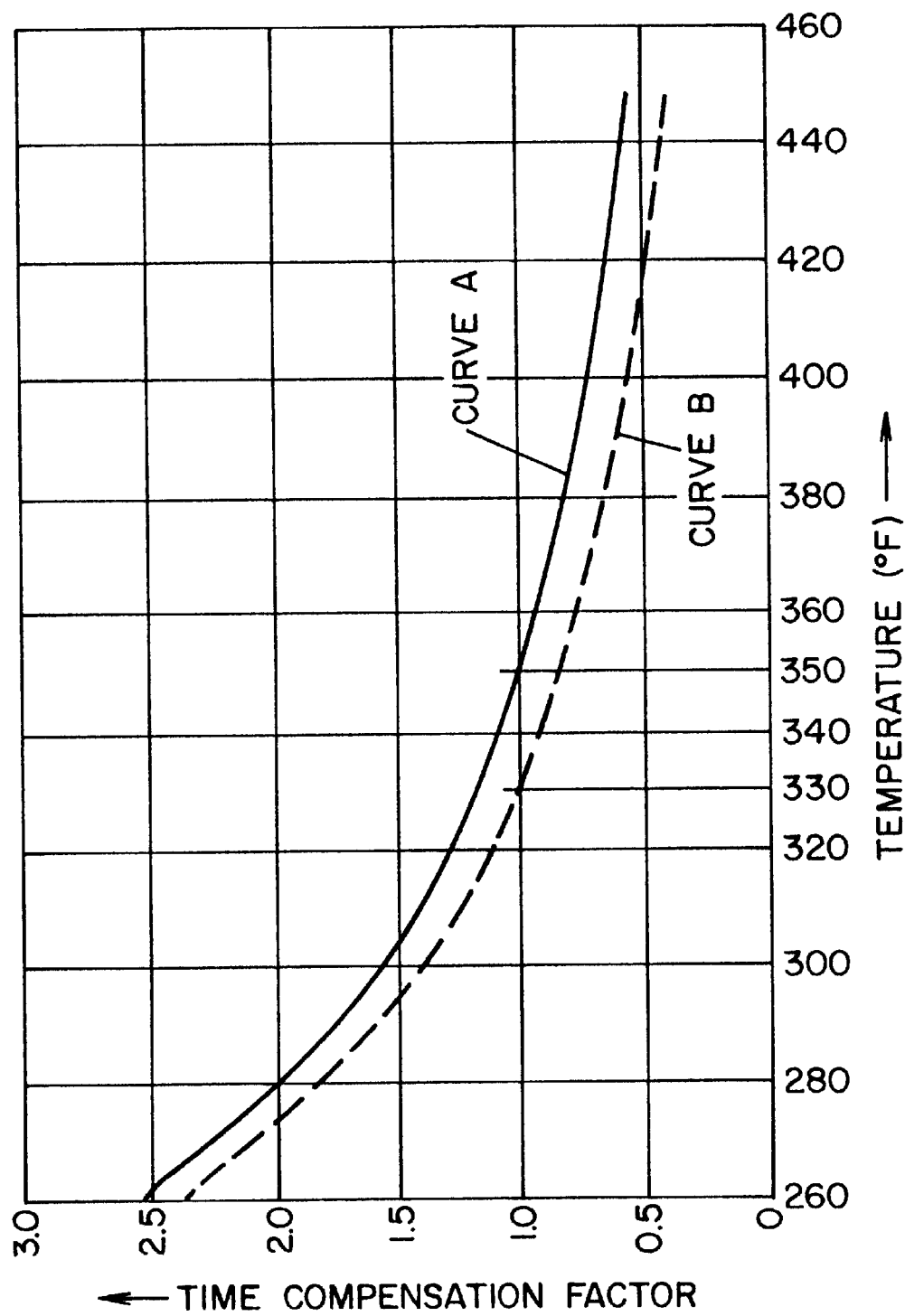
FIG. 8 is a graph showing a time compensation curve for a setpoint temperature of 350° F. and a shifted time compensation curve for a setpoint temperature of 330° F.

In response to selection of a setpoint temperature by an operator, a shift factor is calculated by subtracting the time compensation factor corresponding to 350° F. from the time compensation factor corresponding to the operator selected setpoint temperature. This shift factor is calculated only once for each setpoint temperature selected. Once a cook is initiated, the time compensation factor corresponding to the measured cooking medium temperature is retrieved from the memory, and the retrieved time compensation factor is adjusted by the previously calculated shift factor (i.e., the shift factor is subtracted from the retrieved time compensation factor). The result of this calculation provides the adjusted time compensation factor used to adjust the actual cooking time. FIG. 8 shows a time compensation curve for a setpoint temperature of 350° F. (Curve A) and a shifted time compensation curve for a setpoint temperature of 330° F. (Curve B). A time compensation factor of 1.0 signifies that each second counted by the controller will elapse in one second (i.e., one-for-one time compensation), whereas a time compensation factor of 1.5 signifies that each second counted by the controller will elapse in 1.5 seconds.

One alternative to the foregoing time compensation scheme is to store in memory several sets of time compensation factors from numerous time compensation curves, each having a one-for-one time compensation factor at different temperatures. The set of time compensation factors corresponding most closely with the operator selected setpoint temperature is used for the cook. Accordingly, no shift factor need be calculated. One drawback to this approach is that it requires a relatively large amount of memory.

Another alternative time compensation scheme is to store a set of time compensation factors for a single time compensation curve, but not calculate a shift factor or adjusted time compensation factor. One drawback to this approach is that when the setpoint temperature selected by the operator does not correspond with the stored set of time compensation factors, the operator-programmed cook time will be altered by the time compensation factor associated with the setpoint temperature input by the operator. Accordingly, this approach can lead to confusion of the operator with respect to the desired operator input cook time.

In summary, the present invention provides a system which maximizes the life of heating element components.

These elements include relays, contactors, and in the case of gas fired appliances, ignitors and gas valves. Accordingly, the temperature control algorithm for the idle mode of the present invention is particularly well suited for use with other types of heating apparatus, since it provides accurate temperature control, while also extending the life of heating element components. In addition, the present invention also provides a simple, yet accurate system for time compensation during a cook mode.

The foregoing description is a specific embodiment of the present invention. It should be appreciated that this embodiment is described for purposes of illustration only and that numerous alterations and modifications may be practiced by those skilled in the art without departing from the spirit and scope of the invention.

The invention claimed is:

1. A temperature control system for a heating apparatus comprising:

input means for establishing a setpoint temperature for a medium;

heating means for heating said medium;

sensing means for determining the temperature of the medium;

control means for controlling the amount of heat provided to the medium by the heating means, said control means including a move-to-idle mode of operation for initiating a single pulse of heat to move the temperature of the medium from a temperature below said setpoint temperature to a temperature above said setpoint temperature, wherein during said move-to-idle mode said control means causes said heating means to generate a move-to-idle pulse of heat having a move-to-idle pulse duration sufficient to bring said medium to a temperature above said setpoint temperature from a move-to-idle temperature which is below said setpoint temperature, said control means deriving said move-to-idle pulse duration from thermal characteristics of said heating apparatus and said medium obtained during an earlier operating mode.

2. A temperature control system according to claim 1, wherein said control means further comprises:

means for determining said thermal characteristics of said heating apparatus and said medium by adjusting an idle-on pulse of heat having an idle-on pulse duration, said idle-on pulse generated each time the medium changes from a temperature above an idle-on temperature to a temperature below the idle-on temperature, such that the temperature of the medium remains within a predetermined temperature range about the setpoint temperature.

3. A temperature control system according to claim 2, wherein said control means derives said move-to-idle pulse duration according to the equation:

$$MTIP = \text{integer}\left[(IOP)\left(1 + \frac{T_{SETPOINT} - T_{MTI}}{K}\right)\right]$$

wherein

MTIP is said move-to-idle pulse duration,

IOP is said idle-on pulse duration, $T_{SETPOINT}$ is said setpoint temperature, $T_{MTI}$ is said pulse temperature, and K is the temperature change resulting from said idle-on pulse.

4. A temperature control system according to claim 3, wherein K is a constant and derived from the temperature range resulting from generation of the idle-on pulse of heat.

5. A temperature control system for a heating apparatus comprising:

input device for inputting a setpoint temperature for a medium;

heating element for heating said medium;

temperature sensor for determining the temperature of the medium;

a controller for controlling the amount of heat provided to the medium by the heating element, said controller having a plurality of modes of operation including a move-to-idle mode of operation for moving the temperature of said medium from a temperature below said setpoint temperature to a temperature above said setpoint temperature, wherein said controller causes said heating element to generate a move-to-idle pulse of heat having a move-to-idle pulse duration sufficient to bring said medium to a temperature above said setpoint temperature from a move-to-idle temperature which is below said setpoint temperature, said controller deriving said move-to-idle pulse duration from thermal characteristics of said heating apparatus and medium determined during one of said plurality of modes of operation.

6. A temperature control system according to claim 5, wherein said controller further comprises a first circuit for determining said thermal characteristics of said medium by adjusting an idle-on pulse of heat having an idle-on pulse duration, said idle-on pulse generated each time the medium changes from a temperature above an idle-on temperature to a temperature below the idle-on temperature, such that the temperature of the medium remains within a predetermined temperature range about the setpoint temperature.

7. A temperature control system according to claim 6, wherein said controller derives said move-to-idle pulse duration according to the equation:

$$MTIP = \text{integer}\left[(IOP)\left(1 + \frac{T_{SETPOINT} - T_{MTI}}{K}\right)\right].$$

8. A temperature control system according to claim 7, wherein K is derived from the temperature range resulting from generation of the idle-ON pulse of beat.

9. A method for heating a medium in a heating apparatus comprising:

establishing a setpoint temperature for the medium, determining thermal characteristics of the heating apparatus and the medium during a first mode of operation, said thermal characteristics establishing an idle-on pulse duration for raising the temperature of the medium a first amount;

generating at a move-to-idle temperature a move-to-idle pulse of heat having a move-to-idle pulse duration, said move-to-idle pulse duration being sufficient to raise the temperature of the medium to a temperature above the setpoint temperature, wherein the move-to-idle pulse duration is derived from said idle-on pulse duration and the deviation between the setpoint temperature and the move-to-idle temperature.

10. A method of heating according to claim 9, wherein said thermal characteristics of said heating apparatus and said medium are determined through the process of adjusting the idle-on pulse duration of an idle-on pulse of heat, generated each time the medium changes from a temperature above an idle-on temperature to a temperature below the idle-on temperature, such that the temperature of the medium remains within a predetermined temperature range about the setpoint temperature.

11. A method of heating according to claim 10, wherein said move-to-idle pulse duration is derived from the equation:

$$MTIP = \text{integer}\left[(IOP)\left(1 + \frac{T_{SETPOINT} - T_{MTI}}{K}\right)\right]$$

wherein

MTIP is said move-to-idle pulse duration,

IOP is said idle-on pulse duration, $T_{SETPOINT}$ is said setpoint temperature, $T_{MTI}$ is said pulse temperature, and K is the temperature change resulting from said idle-on pulse.

12. A method of heating according to claim 11, wherein K is a constant and is derived from the temperature range resulting from generation of the idle-ON pulse of heat.

13. A temperature control system for heating a medium in a heating apparatus comprising:

means for applying heat to a medium in each of a plurality of operating modes;

means for determining thermal characteristics of the heating apparatus and the medium during a first mode of said plurality of operating modes;

means for adjusting the temperature of said medium in accordance with the thermal characteristics in a second mode of said plurality of operating modes, wherein said means for adjusting raises the medium temperature above a predetermined temperature with a single pulse of heat determined based upon said thermal characteristics of the heating apparatus and the medium determined during said first mode.

14. A temperature control system for heating a medium, comprising:

a heating element for heating said medium;

a temperature sensor for determining the temperature of said medium;

a controller for controlling said heating element, said controller having:

a first operating mode for establishing a first steady state operating condition, wherein a first pulse of heat of known duration is determined to effect a desired temperature change by said medium, said temperature change and said first pulse being indicative of the thermal response characteristics of said cooking medium at that time, and a second operating mode for generating a second pulse of heat to effect a temperature rise in said cooking medium from a first temperature to a second temperature, the duration of said second pulse of heat being determined by said first pulse of heat and said desired temperature rise.

15. A temperature control system for a heating apparatus comprising:

an input device for establishing a setpoint temperature for a medium;

a heating device for heating said medium;

a sensing device for determining the temperature of the medium;

a controller for controlling the amount of heat provided to the medium by the heating device, said controller having a plurality of operating modes including a move-to-idle mode, wherein said controller in said move-to-idle mode causes said heating device to generate a move-to-idle pulse of heat having a move-to-idle pulse duration sufficient to bring said medium to a temperature above said setpoint temperature from a move-to-idle temperature which is below said setpoint temperature, and means for storing a plurality of move-to-idle pulse durations and the corresponding medium temperature rise value for each move-to-idle pulse duration, wherein for subsequent operations of said move-to-idle mode said controller extrapolates an appropriate move-to-idle pulse duration from said plurality of move-to-idle pulse durations and the corresponding medium temperature rise values.

16. A method for heating a medium in a heating apparatus comprising:

establishing a setpoint temperature for a medium;

controlling the amount of heat provided to the medium during a move-to-idle move of operation, wherein a move-to-idle pulse of heat having a move-to-idle pulse duration is generated to cause a change in temperature of said medium wherein said medium changes to a temperature above said setpoint temperature from a move-to-idle temperature below said setpoint temperature;

storing said pulse duration and said change in temperature in a table of data including a plurality of move-to-idle pulse duration values and a plurality of change in temperature values;

extrapolating from said table of data a move-to-idle pulse duration for a move-to-idle temperature during a subsequent move-to-idle mode of operation, wherein said move-to-idle pulse duration extrapolated from said table of data is sufficient to raise the temperature of the medium to a temperature above the setpoint temperature;

generating a pulse of heat having said move-to-idle pulse duration.

17. A method of heating a medium in a heating apparatus comprising the steps of:

controlling a heating device to establish a steady state operation, wherein periodic pulses of heat maintain the temperature within a predetermined range of temperatures, and wherein each of said pulses of heat produces a generally similar change in the temperature of said medium;

determining from said steady state operation a thermal characteristic of said medium; and generating a pulse of heat of specific duration to raise the temperature of said medium from a first temperature to a second temperature, said specific duration determined based upon the thermal characteristic of said medium.

* * * * *